US012650754B2

(12) United States Patent (10) Patent No.: US 12,650,754 B2
Li et al. (45) Date of Patent: Jun. 9, 2026

(54) THREE-DIMENSIONAL INTERFACE CONTROL METHOD AND TERMINAL

(71) Applicant: HUAWEI TECHNOLOGIES CO., LTD., Shenzhen (CN)

(72) Inventors: Minhao Li, Shanghai (CN); Wenqi Cai, Shenzhen (CN); Xin Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 18/068,328

(22) Filed: Dec. 19, 2022

(65) Prior Publication Data

US 2023/0119849 A1 Apr. 20, 2023

Related U.S. Application Data

(63) Continuation of application No. PCT/CN2021/095952, filed on May 26, 2021.

(30) Foreign Application Priority Data

Jun. 19, 2020 (CN) .......................... 202010565198.3

(51) Int. Cl.
G06F 3/04815 (2022.01)
G06F 3/01 (2006.01)
(Continued)

(52) U.S. Cl.
CPC .......... G06F 3/04815 (2013.01); G06F 3/017 (2013.01); G06F 3/04817 (2013.01);
(Continued)

(58) Field of Classification Search
CPC .. G06F 3/04815; G06F 3/017; G06F 3/04817; G06F 3/0484; G06F 3/167;
(Continued)

(56) References Cited

U.S. PATENT DOCUMENTS 9,395,915 B2 * 7/2016 Waeller .................. B60K 35/22
9,442,900 B2 * 9/2016 Matsumoto ........... G06F 40/103
(Continued)

FOREIGN PATENT DOCUMENTS

CN 103019564 A 4/2013
CN 103914238 A 7/2014
(Continued)

*Primary Examiner* — James T Tsai

(74) *Attorney, Agent, or Firm* — Leydig, Voit & Mayer, Ltd.

(57) ABSTRACT

Embodiments of this disclosure disclose an interface control method, and relate to the field of virtual reality technologies, and are applied to a virtual reality device, an augmented reality device, a mixed reality device, or the like. The method in embodiments of this disclosure includes: dividing, based on a user operation, an interface that includes dividable components and that is displayed in a virtual environment, and separately displaying and controlling sub-interfaces obtained through division. Based on the interface control method, a user may divide the interface including the dividable components based on a user requirement, so that interface display flexibility and user experience are improved.

16 Claims, 21 Drawing Sheets

(51) Int. Cl.
    *G06F 3/04817*    (2022.01)
    *G06F 3/0484*    (2022.01)
    *G06F 3/16*    (2006.01)
(52) U.S. Cl.
    CPC ............ G06F 3/0484 (2013.01); G06F 3/167
        (2013.01); *G06F 2203/04803* (2013.01)
(58) Field of Classification Search
    CPC . G06F 2203/04803; G06F 2203/04806; G06F
                                               3/04845
    See application file for complete search history.

(56)                 References Cited

U.S. PATENT DOCUMENTS 11,262,885  B1 *   3/2022  Burckel .................. G06F 3/011
    2011/0041078  A1 *   2/2011  Park ...................... G06F 3/0481
                                                         715/746
    2014/0098024  A1 *   4/2014  Paek ....................... G06F 3/023
                                                         345/168

2015/0040074  A1 *   2/2015  Hofmann .............. G06T 19/006
                                                         715/852
    2015/0261410  A1 *   9/2015  Kumar ................... H04W 4/08
                                                         715/716
    2018/0024729  A1 *   1/2018  Yang ................... G06F 3/04845
                                                         715/799
    2018/0081539  A1 *   3/2018  Ghassabian .......... G06F 3/0236
    2018/0136835  A1 *   5/2018  Heo ................... G06F 3/04886
    2018/0275744  A1 *   9/2018  Kingsbury ............. G06F 1/163
    2020/0334878  A1 *  10/2020  Tailang .............. G06F 16/5838
    2020/0387229  A1 *  12/2020  Ravasz .................. G06F 3/017
    2021/0181929  A1 *   6/2021  Pan ....................... G01C 21/367
    2021/0199987  A1 *   7/2021  Kaede ................... G02B 30/56
    2023/0152936  A1 *   5/2023  Inch ....................... G06F 3/011
                                                         715/738

FOREIGN PATENT DOCUMENTS

CN        106843498  A     6/2017
    CN        108874126  A    11/2018
    CN        111880647  A    11/2020

* cited by examiner

User          AR/VR/MR device

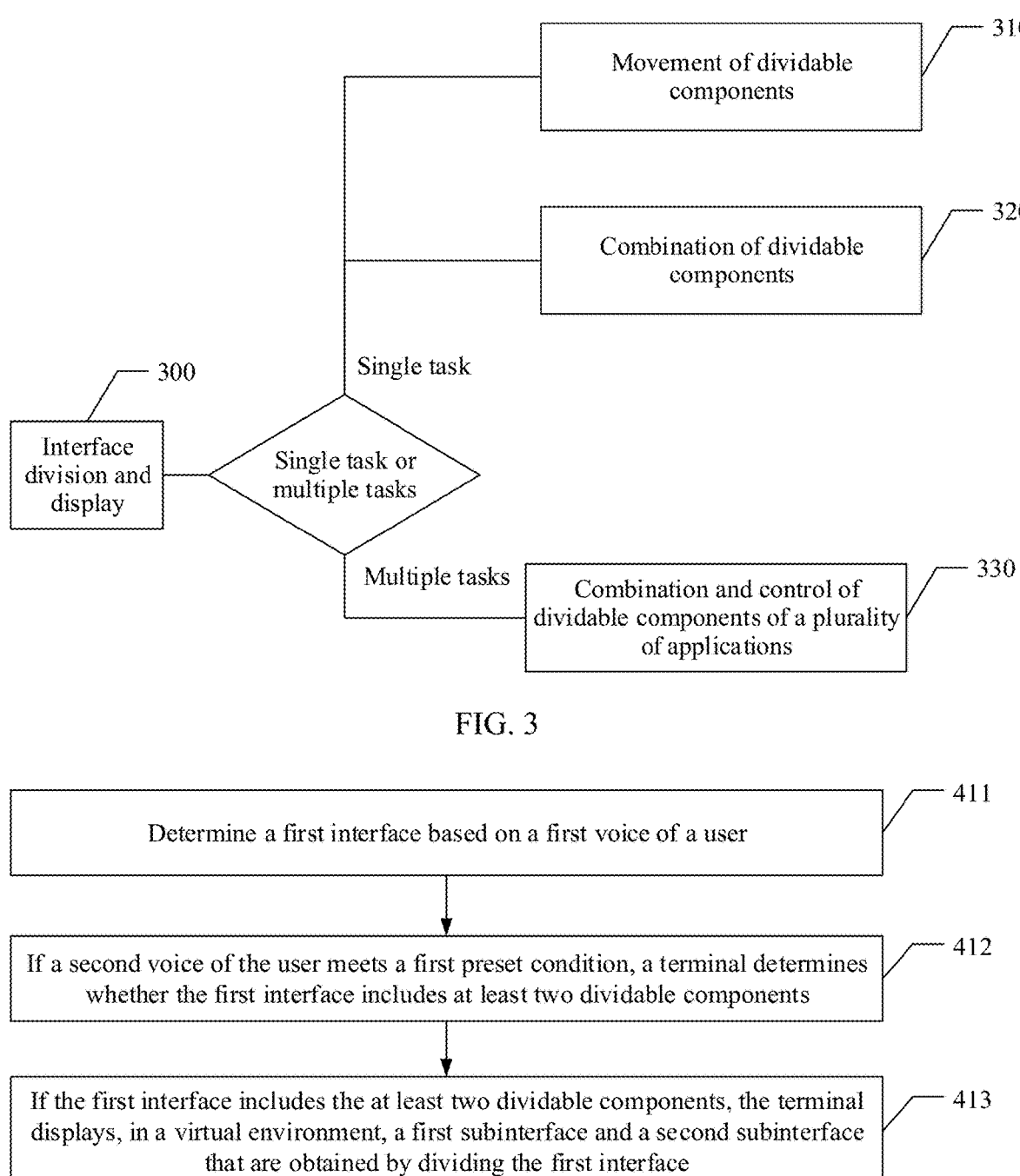

FIG. 3

Determine a first interface based on a first voice of a user — 411

If a second voice of the user meets a first preset condition, a terminal determines whether the first interface includes at least two dividable components — 412

If the first interface includes the at least two dividable components, the terminal displays, in a virtual environment, a first subinterface and a second subinterface that are obtained by dividing the first interface — 413

FIG. 4a

A terminal determines, based on a third operation of a user, a first subinterface located in a third location ⌐ 601

The terminal moves the first subinterface based on a fourth operation of the user ⌐ 602

The terminal displays the first subinterface located in a fourth location ⌐ 603

A terminal moves a first subinterface or a second subinterface ⟋ 801

If a distance between the first subinterface and the second subinterface is less than or equal to a threshold, the terminal combines the first subinterface and the second subinterface into a second interface ⟋ 802

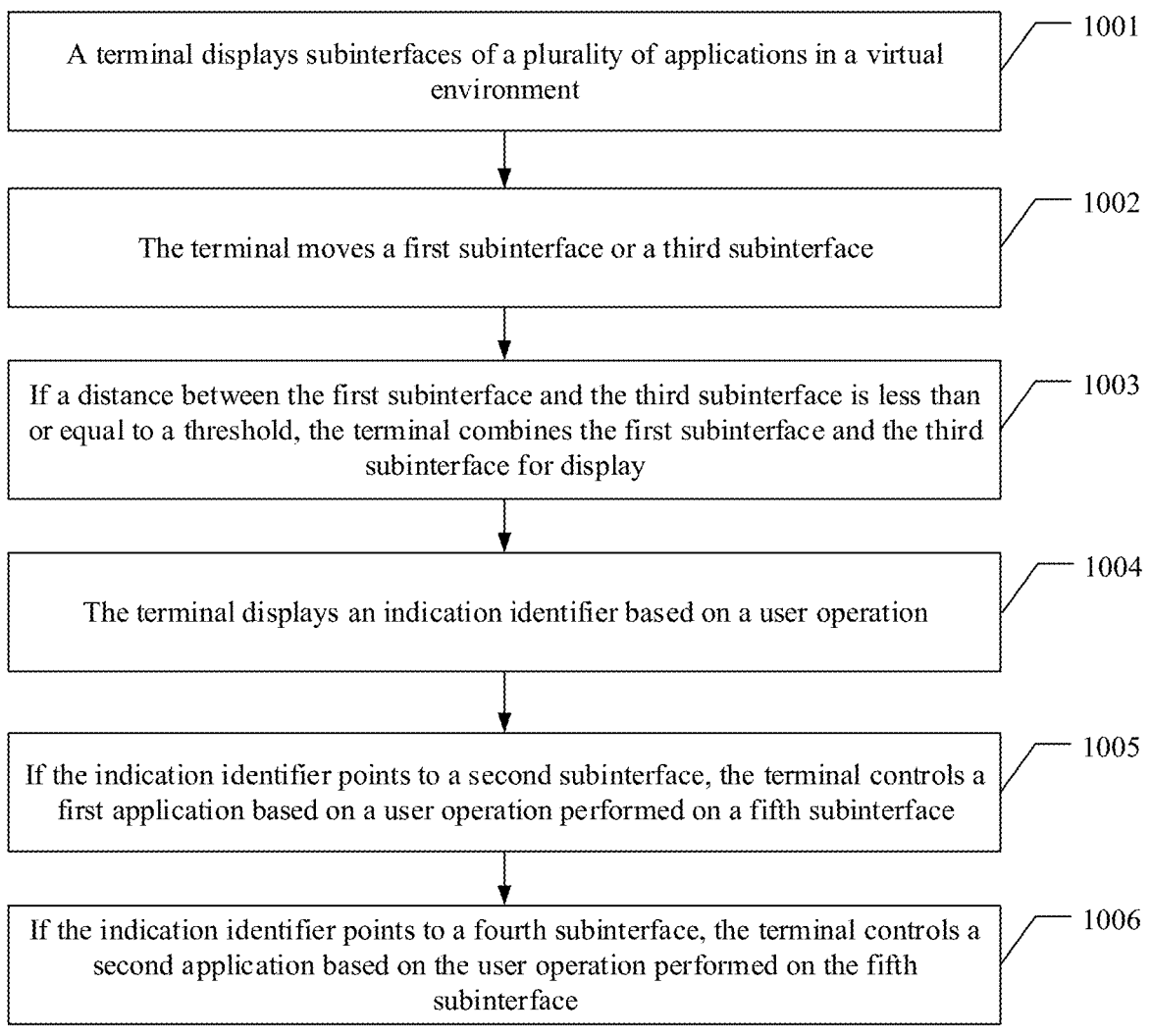

A terminal displays subinterfaces of a plurality of applications in a virtual environment                    1001

The terminal moves a first subinterface or a third subinterface                    1002

If a distance between the first subinterface and the third subinterface is less than or equal to a threshold, the terminal combines the first subinterface and the third subinterface for display                    1003

The terminal displays an indication identifier based on a user operation                    1004

If the indication identifier points to a second subinterface, the terminal controls a first application based on a user operation performed on a fifth subinterface                    1005

If the indication identifier points to a fourth subinterface, the terminal controls a second application based on the user operation performed on the fifth subinterface                    1006

FIG. 10

THREE-DIMENSIONAL INTERFACE CONTROL METHOD AND TERMINAL

CROSS-REFERENCE TO RELATED APPLICATIONS

This disclosure is a continuation of International Patent Application No. PCT/CN2021/095952, filed on May 26, 2021, which claims priority to Chinese Patent Application No. 202010565198.3, filed on Jun. 19, 2020. The disclosures of the aforementioned applications are hereby incorporated by reference in their entireties.

TECHNICAL FIELD

This disclosure relates to the field of virtual reality technologies, and in particular, to a three-dimensional interface control method and a terminal.

BACKGROUND

In a scenario such as virtual reality (VR), augmented reality (AR), or mixed reality (MR), a terminal provides interactive immersive experience for a user by constructing a virtual environment. In the virtual environment, the terminal interacts or exchanges information with the user through a three-dimensional user interface (3D UI). The 3D UI is a medium for direct interaction or information exchange between a system and the user in a three-dimensional environment. With the development of virtual reality technologies, the 3D UI is widely used in VR, AR, and MR products, covering various fields such as office, audio and video, entertainment, and industry.

A separate interface refers to separate subinterfaces formed by dividing different functional areas of a same application in space, and there is a gap between different subinterfaces. The separate interface is a common design and layout manner in the 3D UI, and can fully use infinite display space in the virtual environment, and help the application distinguish functional areas, such as a display area or an operation area, based on an operation habit of the user.

However, an existing dividable interface has a preset layout, and each subinterface is displayed in a fixed location. When the user moves, a subinterface corresponding to the operation area may be far away from the user, and user experience is poor.

SUMMARY

An embodiment of this disclosure provides an interface control method to divide an interface into subinterfaces for display based on a user operation, improving interface display flexibility and user experience.

A first aspect of an embodiment of this disclosure provides an interface control method. The method includes: A terminal obtains a first operation performed by a user on a first interface displayed in a virtual environment; if the first interface includes at least two dividable components, the terminal obtains preset division location information on the first interface, where the division location information indicates a boundary between two adjacent dividable components on the first interface; and if the first operation meets a preset condition, the terminal displays, in the virtual environment based on the first operation and location information of a division line, a first subinterface and a second subinterface that are obtained by dividing the first interface, where the first subinterface includes a first dividable component of the at least two dividable components, and the second subinterface includes a second dividable component adjacent to the first dividable component.

The interface control method is applied to a VR, AR, or MR product. For the interface displayed in the virtual environment, if the interface includes at least two dividable components, division location information between the dividable components may be preset. In response to the first operation obtained by the terminal on the first interface displayed in the virtual environment, the terminal may divide the interface into at least two subinterfaces respectively for display and control based on the preset division location information. Based on the interface control method, the user may divide the interface including the dividable components based on a user requirement, so that interface display flexibility and user experience are improved.

In an embodiment of the first aspect, the first operation includes first voice information obtained by the terminal by using a voice collection apparatus, or a first gesture obtained by the terminal by using a sensor system.

In the method, the user operation may be voice information or a gesture. In other words, the user divides the interface by using a voice or a gesture. The operation is convenient.

In an embodiment of the first aspect, the first gesture includes: moving a flat palm with fingers together by a preset distance in a first direction in which a palm plane extends, where the first direction in which the palm plane extends is parallel to the boundary.

The method provides a specific division gesture. The user moves a hand along the palm plane, to provide information of an expected division manner to the terminal. The gesture is simple and complies with a user habit, and operation efficiency can be improved.

In an embodiment of the first aspect, the method further includes: The terminal displays the division line on a boundary between the first dividable component and the second dividable component.

In the method, the terminal displays the division line in a division location of the interface, so that a division guide can be provided for the user, and operation efficiency can be improved.

In an embodiment of the first aspect, the displaying, by the terminal in the virtual environment based on division location information in response to the first operation, a first subinterface and a second subinterface that are obtained by dividing the first interface specifically includes:

The terminal displays the first subinterface in a first location, and displays the second subinterface in a second location, where the first location is the same as a first initial location, a distance between the second location and a second initial location in a direction away from the first initial location is a first preset value, the first initial location is a location of the first subinterface on the first interface when the terminal obtains a first instruction, and the second initial location is a location of the second subinterface on the first interface when the terminal obtains the first instruction; or the second location is the same as a second initial location, and a distance between the first location and a first initial location in a direction away from the second initial location is a second preset value; or a distance between the first location and a first initial location in a direction away from a second initial location is a third preset value, and a distance between the second location and the second initial location in a direction away from the first initial location is a fourth preset value.

This method provides various forms of locations displayed after the interface is divided into the subinterfaces, where some subinterfaces may be moved, or the subinterfaces may be away from each other. This method provides various separation forms, and improves flexibility of implementing the solution. In addition, a relative distance between the subinterfaces obtained through division is increased, and information of division completion may be fed back to the user, so that the user subsequently separately controls the subinterfaces, and user experience can be improved.

In an embodiment of the first aspect, the method further includes: The terminal moves the first subinterface in response to a second operation on the first subinterface. Optionally, the second operation may include one or more gestures. Optionally, the more gestures include a gesture for the terminal to select the first subinterface and a gesture for the first subinterface to follow.

In this method, a method for moving a subinterface based on the user operation is provided. Because the subinterface may be independently moved based on the user operation, in a scenario in which the user moves, the subinterface may continue to keep a close distance from the user, so that user experience can be improved.

In an embodiment of the first aspect, the second operation includes: a pinch grip gesture pointing to the first subinterface, where the pinch grip gesture includes a hand state in which a thumb approaches at least one of four fingers, and keeping the pinch grip gesture and moving; or touching and holding the first subinterface and moving; or keeping an open palm gesture and moving, where the open palm gesture includes a hand state with fingers together and a palm up.

In this method, various specific manners of moving the subinterface by the user by using a gesture are provided, including moving by using a pinch grip gesture, moving by using a touch gesture, or moving by using an open palm gesture. Because display space in the virtual environment is huge, when the user moves the interface in a short distance, a gesture such as the pinch grip gesture or the touch gesture may be used. In a scenario in which the interface is moved in a long distance, it is difficult to maintain a pinch grip or touch state of the interface. In this scenario, the interface may follow the open palm gesture. Because a distance between the user gesture and the interface is not limited when the interface follows, an operation is more convenient. This method provides various manners of moving an interface, and flexibility is high.

In an embodiment of the first aspect, the method further includes: The terminal moves the first subinterface; and if a distance between the first subinterface and the second subinterface is less than a first threshold, the terminal displays, in the virtual environment, a second interface obtained by combining the first subinterface and the second subinterface, where a layout of the second interface is the same as or different from a layout of the first interface.

This method provides a method of combining and restoring the divided subinterfaces, and improves completeness of implementing the solution. In this method, the terminal may restore an original interface layout during combination and restoration based on before-division location information of the subinterface on the first interface. In addition, a layout of the combined interface may be different from a before-division layout of the first interface. In other words, according to a manner in which the subinterfaces are close to each other when the user combines the subinterfaces, the layout of the second interface is determined, so that diversity of interface layouts is improved.

In an embodiment of the first aspect, the method further includes: The terminal displays a third interface in the virtual environment, where the first interface is an interface of a first application, and the third interface is an interface of a second application; the terminal moves the first subinterface and/or the third interface; and if a distance between the first subinterface and the third interface is less than a second threshold, the terminal displays, in the virtual environment, a fourth interface obtained by combining the first subinterface and the third interface.

The method provides a cross-application interface combination display manner. In some application scenarios, the user may combine the subinterface of the first application and the interface of the second application for display. For example, the user may combine a lyrics display interface of a music application and an MV playback picture of a video application for display, so that the user can simultaneously experience functions of a plurality of applications.

In an embodiment of the first aspect, the method further includes: The terminal displays a third subinterface and a fourth subinterface in the virtual environment, where the third subinterface and the fourth subinterface are obtained by dividing the third interface, the first interface is the interface of the first application, and the third interface is the interface of the second application; the terminal moves the first subinterface and/or the third subinterface; and if a distance between the first subinterface and the third subinterface is less than a third threshold, the terminal displays, in the virtual environment, a fifth subinterface obtained by combining the first subinterface and the third subinterface.

The method provides a cross-interface combination display manner. In some application scenarios, the user may combine the subinterface of the first application and the subinterface of the second application for display. Specifically, the two subinterfaces are moved, and when the distance between the two subinterfaces is less than the threshold, the two subinterfaces are combined into one subinterface. Optionally, the control interface of the first application and the control interface of the second application are combined into one subinterface. Only one icon corresponding to a same control function is reserved on the control interface of the first application and the control interface of the second application. An icon of a control function unique to the control interface of the first application relative to the control interface of the second application is reserved in the combined subinterface.

In an embodiment of the first aspect, the first subinterface includes a first icon for controlling a first function of the first application. The third subinterface includes a second icon for controlling a second function of the second application. The first function is the same as the second function. The fifth subinterface includes a third icon. The third icon is used to control the first function of the first application and the second function of the second application.

In this method, a method for combining subinterfaces of different applications and combining and displaying icons corresponding to a same function is specifically described. This can reduce occupancy on a display interface of the virtual environment and avoid repeated display of a same function icon of a plurality of applications.

In an embodiment of the first aspect, the first subinterface is an input interface of the first application. The second subinterface is an output interface of the first application. The third subinterface is an input interface of the second application. The fourth subinterface is an output interface of the second application. The method further includes: The terminal displays an indication identifier on an edge of the fifth subinterface, where the indication identifier is used to determine an application currently controlled by the fifth subinterface; when the indication identifier points to the second subinterface, the terminal controls the first application based on an input operation performed on the fifth subinterface; and when the indication identifier points to the fourth subinterface, the terminal controls the second application based on an input operation performed on the fifth subinterface. The input interface is an interface on which the terminal obtains an input of the user, and the output interface is an interface on which the terminal outputs information to the user. Optionally, the input interface includes a control interface, and the output interface includes a video image display interface or a lyrics display interface.

This solution provides a method for controlling a plurality of applications. The two applications may be separately controlled in an aimed manner on the fifth subinterface obtained by combining the input subinterfaces of the first application and the second application. This improves utilization efficiency of an input control area, and avoids that the user needs to change an input interface to separately control an application when simultaneously using the plurality of applications, operation is convenient, and user experience is good.

A second aspect of an embodiment of this disclosure provides a terminal. The terminal includes: an obtaining unit, configured to obtain a first operation on a first interface displayed in a virtual environment, where the first interface includes at least two dividable components; and a display unit, configured to display, in the virtual environment based on division location information in response to the first operation, a first subinterface and a second subinterface that are obtained by dividing the first interface, where the first subinterface includes a first dividable component of the at least two dividable components, the second subinterface includes a second dividable component adjacent to the first dividable component, and the division location information includes a boundary between the first dividable component and the second dividable component.

In an embodiment of the second aspect, the first operation includes first voice information obtained by the terminal by using a voice collection apparatus, or a first gesture obtained by the terminal by using a sensor system.

In an embodiment of the second aspect, the first gesture includes: moving a flat palm with fingers together by a preset distance in a first direction in which a palm plane extends, where the first direction in which the palm plane extends is parallel to the boundary.

In an embodiment of the second aspect, the display unit is further configured to display a division line on a boundary between the first dividable component and the second dividable component.

In an embodiment of the second aspect, the display unit is specifically configured to:

display the first subinterface in a first location, and display the second subinterface in a second location.

The first location is the same as a first initial location, a distance between the second location and a second initial location in a direction away from the first initial location is a first preset value, the first initial location is a location of the first subinterface on the first interface when the terminal obtains a first instruction, and the second initial location is a location of the second subinterface on the first interface when the terminal obtains the first instruction; or the second location is the same as a second initial location, and a distance between the first location and a first initial location in a direction away from the second initial location is a second preset value; or a distance between the first location and a first initial location in a direction away from a second initial location is a third preset value, and a distance between the second location and the second initial location in a direction away from the first initial location is a fourth preset value.

In an embodiment of the second aspect, the terminal further includes:

a processing unit, configured to move the first subinterface in response to a second operation on the first subinterface.

In an embodiment of the second aspect, the second operation includes: a pinch grip gesture pointing to the first subinterface, where the pinch grip gesture includes a hand state in which a thumb approaches at least one of four fingers, and keeping the pinch grip gesture and moving; or touching and holding the first subinterface and moving; or keeping an open palm gesture and moving, where the open palm gesture includes a hand state with fingers together and a palm up.

In an embodiment of the second aspect, the terminal further includes:

a processing unit, configured to move the first subinterface.

The display unit is further configured to: if a distance between the first subinterface and the second subinterface is less than a first threshold, display, in the virtual environment, a second interface obtained by combining the first subinterface and the second subinterface, where a layout of the second interface is the same as or different from a layout of the first interface.

In an embodiment of the second aspect, the terminal further includes:

The display unit is further configured to display a third interface in the virtual environment, where the first interface is an interface of a first application, and the third interface is an interface of a second application.

The processing unit is further configured to move the first subinterface and/or the third interface.

The display unit is further configured to: if a distance between the first subinterface and the third interface is less than a second threshold, display, in the virtual environment, a fourth interface obtained by combining the first subinterface and the third interface.

In an embodiment of the second aspect, the display unit is further configured to display a third subinterface and a fourth subinterface in the virtual environment, where the third subinterface and the fourth subinterface are obtained by dividing the third interface, the first interface is the interface of the first application, and the third interface is the interface of the second application.

The processing unit is further configured to move the first subinterface and/or the third subinterface.

The display unit is further configured to: if a distance between the first subinterface and the third subinterface is less than a third threshold, display, in the virtual environment, a fifth subinterface obtained by combining the first subinterface and the third subinterface.

In an embodiment of the second aspect, the first subinterface includes a first icon for controlling a first function of the first application. The third subinterface includes a second icon for controlling a second function of the second application. The first function is the same as the second function.

The fifth subinterface includes a third icon. The third icon is used to control the first function of the first application and the second function of the second application.

In an embodiment of the second aspect, the first subinterface is an input interface of the first application. The second subinterface is an output interface of the first application. The third subinterface is an input interface of the second application. The fourth subinterface is an output interface of the second application.

The display unit is further configured to display an indication identifier on an edge of the fifth subinterface, where the indication identifier is used to determine an application currently controlled by the fifth subinterface.

The terminal further includes:

a control unit, configured to: when the indication identifier points to the second subinterface, control the first application based on an input operation performed on the fifth subinterface.

The control unit is further configured to: when the indication identifier points to the fourth subinterface, control, by the terminal, the second application based on an input operation performed on the fifth subinterface.

A third aspect of an embodiment of this disclosure provides a terminal. The terminal includes one or more processors and a memory. The memory stores computer-readable instructions. The one or more processors read the computer-readable instructions in the memory, and the terminal is enabled to implement the method according to any one of the first aspect or the possible implementations.

In an embodiment of the third aspect, the terminal includes a virtual reality device, an augmented reality device, or a mixed reality device.

In an embodiment of the third aspect, the terminal includes a head-mounted display device.

A fourth aspect of embodiments of this disclosure provides a computer program product including instructions. When the computer program product runs on a computer, the computer is enabled to perform the method according to any one of the first aspect and the possible implementations.

A fifth aspect of embodiments of this disclosure provides a computer-readable storage medium including instructions. When the instructions are run on a computer, the computer is enabled to perform the method according to any one of the first aspect and the possible implementations.

According to a sixth aspect, an embodiment of this disclosure provides a chip, including a processor. The processor is configured to read and execute a computer program stored in a memory, to perform the method according to any possible implementation of any one of the foregoing aspects. Optionally, the chip includes the memory, and the memory and the processor are connected to the memory by using a circuit or a wire. Further, optionally, the chip further includes a communication interface, and the processor is connected to the communication interface. The communication interface is configured to receive data or information or both that need to be processed. The processor obtains the data and/or the information from the communication interface, processes the data and/or the information, and outputs a processing result through the communication interface. The communication interface may be an input/output interface.

For technical effects brought by any embodiment of the second aspect to the sixth aspect, refer to technical effects brought by corresponding embodiments of the first aspect. Details are not described herein again.

It may be learned from the foregoing technical solutions that this embodiment of this disclosure has the following advantages: According to the interface control method provided in this embodiment of this disclosure, for the interface displayed in the virtual environment, if the interface includes at least two dividable components, the terminal presets division location information between the dividable components, and in response to the first operation of the user, the terminal may divide the interface into at least two subinterfaces respectively for display and control based on the preset division location information. Based on the interface control method, the user may divide the interface including the dividable components based on requirements in different application scenarios, so that interface display flexibility and user experience are improved.

BRIEF DESCRIPTION OF DRAWINGS

FIG. 3 is a schematic diagram of a system architecture of a three-dimensional interface control method according to an embodiment of this disclosure;

FIG. 4a is a schematic diagram of an embodiment of a three-dimensional interface division method according to an embodiment of this disclosure;

FIG. 10 is a schematic diagram of an embodiment of a combination method of three-dimensional subinterfaces of a plurality of applications according to an embodiment of this disclosure;

DESCRIPTION OF EMBODIMENTS

Figure 1:
FIG. 1 is a diagram of a system architecture according to an embodiment of this disclosure.

Embodiments of this disclosure provide an interface control method, to implement flexible control of a three-dimensional interface.

The following describes embodiments of this disclosure with reference to the accompanying drawings. It is clear that the described embodiments are merely some but not all of embodiments of this disclosure. A person of ordinary skill in the art may learn that as a technology evolves and a new scenario emerges, technical solutions provided in embodiments of this disclosure are also applicable to a similar technical problem.

In the description, claims, and accompanying drawings of this disclosure, the terms "first", "second", and the like are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device. Names or numbers of steps in this disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

First, some technical terms used in embodiments of this disclosure are briefly described.

1. A virtual reality (VR) technology uses a computer to generate a simulated environment, so that a user is immersed in a virtual environment. The virtual reality technology uses data in real life and electronic signals generated by computer technologies to combine the electronic signals with various output devices, so that the electronic signals are converted into phenomena that can be perceived by people. These phenomena may be true objects in real life or substances that are invisible to naked eyes, and are represented by using a three-dimensional model. Because these phenomena are not directly visible to us, but the real world simulated by computer technologies, they are called virtual reality.

2. An augmented reality (AR) technology is a technology that cleverly integrates virtual information with the real world. A plurality of technical means such as multimedia, three-dimensional modeling, real-time tracking and registration, intelligent interaction, and sensing are widely used to simulate virtual information such as a text, an image, a three-dimensional model, music, and a video that are generated by a computer. Then, simulated information is applied to the real world, and the two types of information complement each other, to implement "augmentation" of the real world.

3. Mixed reality (MR) is a further development of VR and AR technologies, and introduces real-world scenario information into virtual environments to build a bridge between the virtual world, real world, and users for information interaction and feedback, so that user experience is enhanced. Mixed reality generally uses an optical perspective technology to superimpose virtual images on human eyes.

4. Mediated reality

The VR technology displays pure virtual digital images. The mixed reality (including AR) is virtual digital images+naked-eye reality, while the mediated reality is digital reality+virtual digital images.

In a scenario such as VR, AR, or MR, both a real world simulated by using a computer technology and virtual information such as a text, an image, a three-dimensional model, music, and a video generated by a computer are simulated, and all of the virtual scenarios involve a digital virtual scenario. The virtual scenario is usually implemented by using a VR device, an AR device, or an MR device. To provide interactive immersive experience for a user, physical hardware such as a handle or a touchpad, or a system such as a head aiming or a gesture operation may be used to perform an interface control operation, and the interface control operation is used as user input of the device. In a specific implementation process of performing interface control by using a gesture operation, a gesture operation (including a gesture and location information of the gesture) of the user is obtained by using a sensor system of the device. In addition, generally a gesture of a user and location information of the gesture are variable in real time. A gesture obtained by a sensor system is mapped to a field of view of a device. In other words. a gesture operation in a real world is mapped to a status and a location movement of an operation icon (such as a hand or an arrow) in a virtual scenario, and the status and the location movement are displayed in real time on a display interface of the device, so that the user clearly perceives a real-time operation status of the user on a three-dimensional interface in the virtual scenario, and the mapping between the real world and the location in the virtual scenario is a conventional technology. Details are not described herein again.

This disclosure is mainly applied to a VR device, an AR device, or an MR device, for example, a head mounted display (HMD). A device usually supports a plurality of applications, such as a word processing application, a telephone application, an email application, an instant message application, a photo management application, a network browsing application, a digital music player application, and/or a digital video player application. The applications are briefly referred to as an application in subsequent embodiments, and a specific type of the application is not limited. An interface of an application displayed in the virtual environment is a three-dimensional interface. The interface is briefly referred to as an interface in embodiments of this disclosure.

In an existing three-dimensional interface division method, a subinterface is displayed based on a preset layout. Because a subinterface that is displayed separately occupies more space, generally only one separate interface application can be displayed in a visible area of a user, and a multi-application and multi-task use scenario of the user is limited. For example, when the user wants to use a dividable music interface and a dividable modeling application interface at the same time, the two application interfaces cannot be displayed in one visible area at the same time. If the two application interfaces are displayed in the same visible area, a problem of displaying function areas of different applications may occur. As a result, the user cannot clearly identify the interface to which a specific function area belongs. In addition, the divided operation area is displayed in a fixed location. When the user moves, a subinterface corresponding to the operation area may be far away from the user, and user experience is poor.

The interface control method provided in embodiments of this disclosure may be applied to a terminal device such as a VR device, an AR device, or an MR device. The three-dimensional interface of the application can be displayed through an infinite virtual environment.

FIG. 1 is a diagram of a system architecture of a three-dimensional interface control method according to an embodiment of this disclosure.

A user controls an application based on a three-dimensional user interface by using a terminal device such as AR or VR glasses. The 3D UI is a medium for direct interaction or information exchange between a system and the user in a three-dimensional environment, and is an overall design based on human-machine interaction, operation logic, and a beautiful interface. Although a display range of the virtual environment is wider, a distance between the interface and the user is longer. As a result, the user needs to perform an operation in a long distance and intuitively, and efficiency is reduced. The three-dimensional interface control method provided in this embodiment of this disclosure is used to implement division, movement, combination, and control of the three-dimensional interface displayed in a virtual environment, to improve operation convenience of the user.

Figure 2:
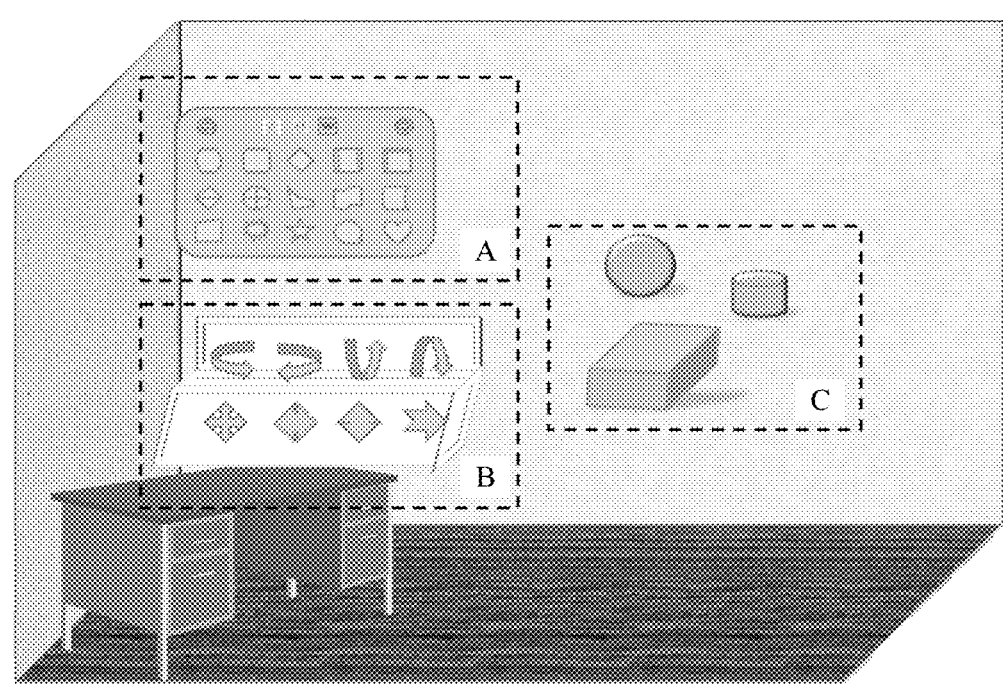
FIG. 2 is a schematic diagram of a dividable three-dimensional interface according to an embodiment of this disclosure.

FIG. 2 is a schematic diagram of an embodiment of a separate interface according to an embodiment of this disclosure. FIG. 2 shows a three-dimensional interface of a drawing application, including three dividable three-dimensional subinterfaces: A, B, and C. A separate interface refers to dividing different functional areas of a same application in space, and there is usually some gap between different three-dimensional interfaces. The separate interface is a common design and layout manner in the VR, AR, or MR three-dimensional interfaces. This design can fully use infinite space in the virtual environment, and help the application distinguish different functional areas, such as a display area or an operation area, based on an operation habit of the user. In this embodiment of this disclosure, a functional area that can be independently displayed on the three-dimensional interface is referred to as a dividable component.

FIG. 3 is a diagram of an architecture of a three-dimensional interface control method according to an embodiment of this disclosure.

This method provides a method for dividing a three-dimensional interface in a virtual environment into three-dimensional subinterfaces. In other words, interface division and display 300 are performed, and subinterfaces obtained by dividing the single three-dimensional interface may be separately displayed and controlled, to implement movement 310 of dividable components or combination 320 of a plurality of dividable components. In addition, the three-dimensional interfaces of a plurality of applications displayed in the virtual environment may be divided separately. For the dividable components that have a same function in different applications, combination and control 330 of the dividable components of the plurality of applications may be combined and controlled. For example, controllers of different applications may be combined into one multi-functional controller, to control the plurality of applications.

The following describes in detail different embodiments.

I. Interface Division and Display

A terminal may divide a first three-dimensional interface into subinterfaces based on a user operation, and separately display the subinterfaces in a virtual environment. The user operation includes a voice or a gesture. The following provides specific descriptions.

1. An interface is divided based on a voice of a user. FIG. 4a is a schematic diagram of an embodiment of a three-dimensional interface control method according to an embodiment of this disclosure.

411: Determine a first interface based on a first voice of a user.

A terminal determines the first interface based on the first voice that is made by the user and that is obtained by a voice collection device.

The first interface is an interface of a first application. The first voice may be a voice for waking up the first application, for example, a voice such as "music player" or "WeChat". If the first voice matches a voice in a preset first voice database of the first application, the terminal determines the first interface.

412: If a second voice of the user meets a first preset condition, the terminal determines whether the first interface includes at least two dividable components.

The terminal obtains, by using the voice collection device, the second voice made by the user, where the first preset condition may be that the second voice matches a voice in a preset second voice database. If the second voice matches a voice in the preset second voice database, and the second voice corresponds to a division instruction, for example, a voice such as "dividing" or "division", the terminal determines whether the first interface includes the at least two dividable components.

413: If the first interface includes the at least two dividable components, the terminal displays, in a virtual environment, a first subinterface and a second subinterface that are obtained by dividing the first interface.

If the first interface includes the at least two dividable components, the terminal obtains preset division location information on the first interface. The first subinterface and the second subinterface that are obtained by dividing the first interface are separately displayed in the virtual environment based on the division location information. It may be understood that the first interface may include more than two dividable components. In this step, the terminal may display the more than two dividable components.

2. An interface is divided based on a gesture of a user.

Figure 4B:
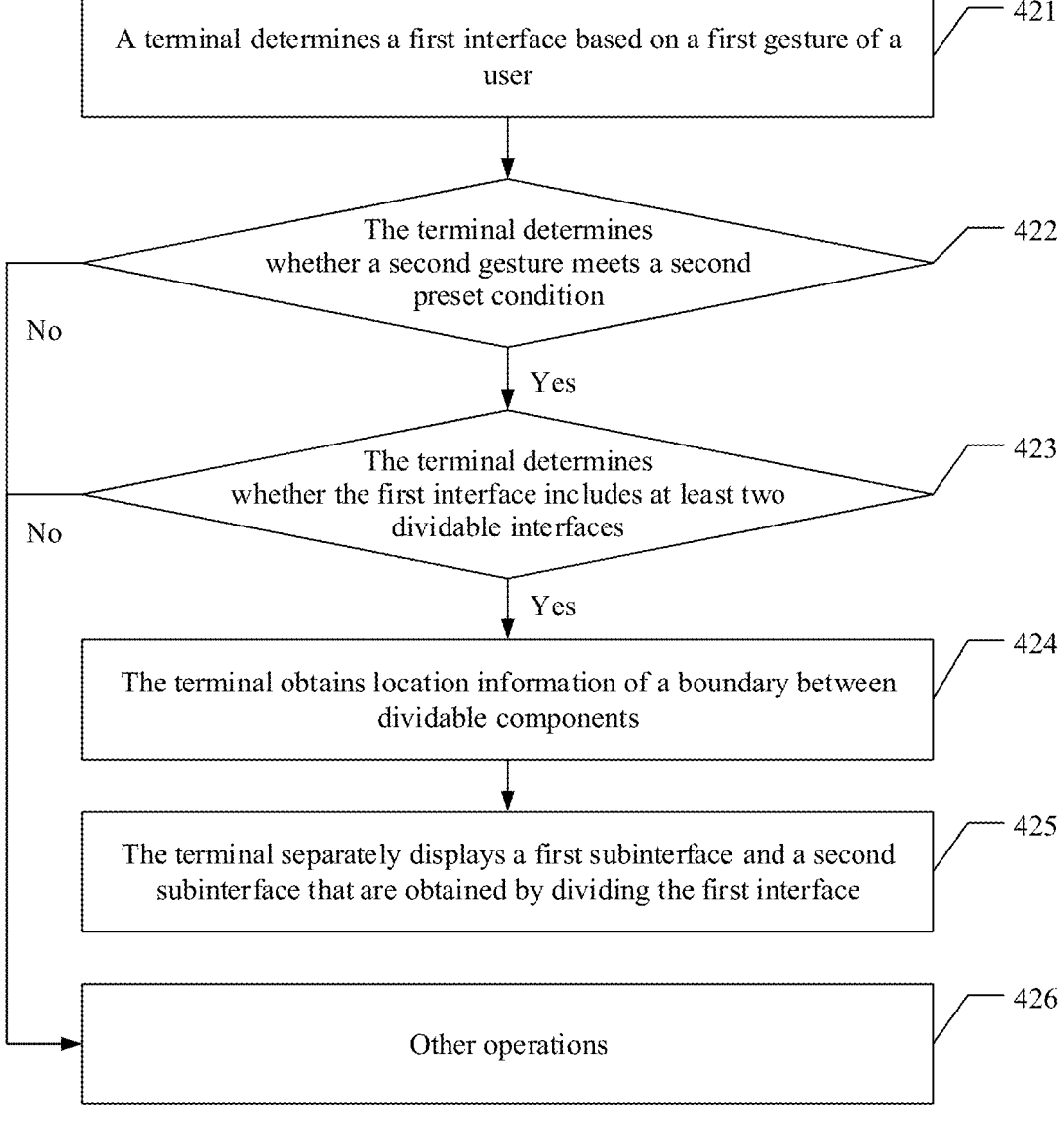
FIG. 4b is a schematic diagram of another embodiment of a three-dimensional interface division method according to an embodiment of this disclosure.

FIG. 4*b* is a schematic diagram of another embodiment of a three-dimensional interface control method according to an embodiment of this disclosure.

421: A terminal determines a first interface based on a first gesture of a user.

The terminal displays a three-dimensional interface of an application in a virtual environment, where the three-dimensional interface includes a dividable three-dimensional interface or an indivisible three-dimensional interface. The dividable three-dimensional interface usually includes a plurality of independent components, for example, a display component or a control component. Whether the interface can be divided may be marked by a developer when a program is launched, and a specific method is not described herein again.

The terminal determines the first interface based on a first operation of the user.

The first gesture includes a user gesture obtained by the terminal by using an image collection device. The first gesture may be, for example, a movement of the user gesture. If the first gesture matches a gesture in a preset first gesture database, it means that the first gesture is the same as the gesture in the preset first gesture database, or a difference between the first gesture and the gesture in the preset first gesture database is less than a preset threshold. The terminal determines the first interface. For example, the first gesture is a user gesture approaching the first interface to a location in which a distance between the user gesture and the first interface is less than the preset threshold, or the first gesture is a gesture pointing to the first interface.

Figure 5A:
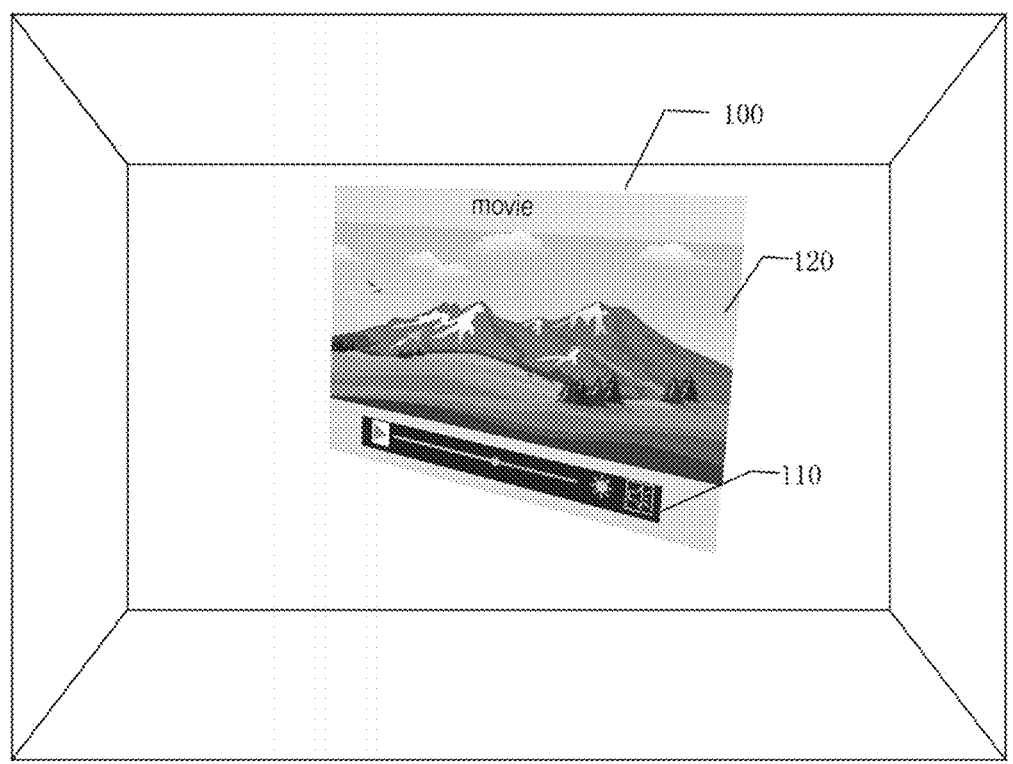
FIG. 5a is one schematic diagram of three-dimensional interface division according to an embodiment of this disclosure.

For example, as shown in FIG. 5*a*, the first interface is an interface 100 of a video (movie) playback application, and includes two dividable components: a video playback component 120 and a video control component 110. The control component is generally a component that operates and controls the application, for example, play or pause; or zooming, moving, or rotating performed on a three-dimensional element. For example, the video control component 110 shown in FIG. 5*a* includes operation components such as play, pause, and a video progress bar.

422: The terminal determines whether a second operation of the user meets a preset condition; and if the second operation of the user meets the preset condition, performs step 423, or if the second operation of the user does not meet the preset condition, performs step 426.

Figure 5B:
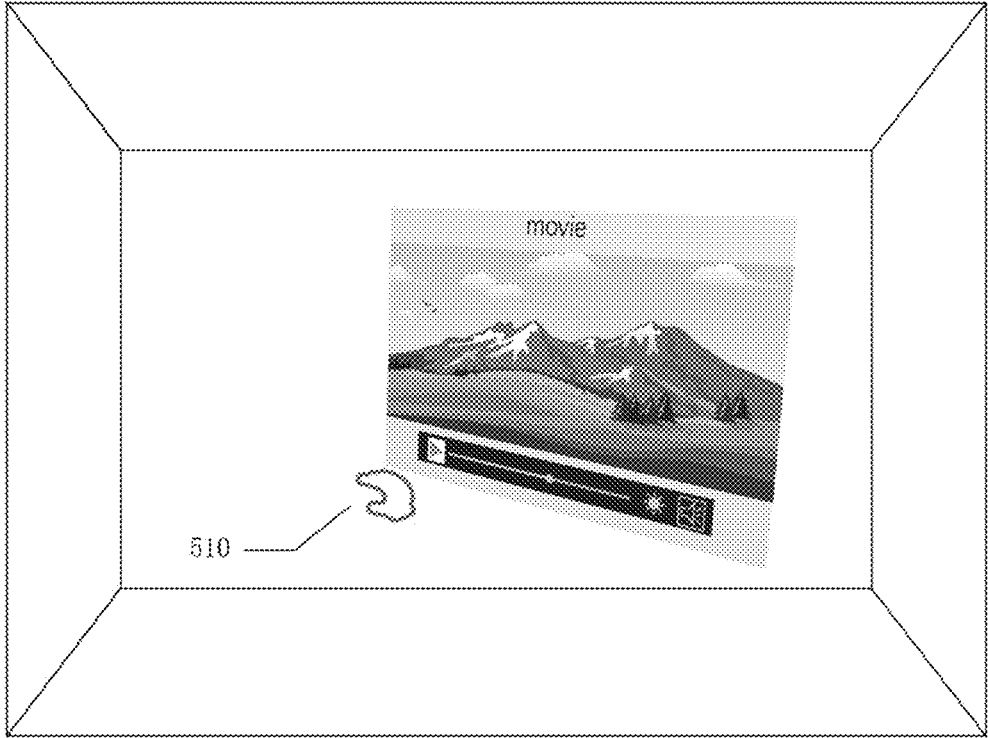
FIG. 5b is another schematic diagram of three-dimensional interface division according to an embodiment of this disclosure.

The terminal obtains the second operation performed by the user on the first interface by using a sensor system, where the second gesture is a user gesture obtained by the terminal by using the image collection device, for example, a gesture 510 shown in FIG. 5*b*.

The first preset condition includes that the second gesture matches a gesture in a preset second gesture database. That the terminal may determine whether the second gesture matches the gesture in the preset second gesture database means that the second gesture is the same as the gesture in the preset second gesture database, or a difference between the second gesture and the gesture in the preset second gesture database is less than a preset threshold. The gesture in the second gesture database is a pre-stored "cut gesture", and may include one or more gestures for indicating interface division. For example, the gesture in the first gesture database includes a hand state in which five fingers are close together and a palm is flat. If the second operation performed by the user on the first interface meets the first preset condition, the terminal determines whether the first interface is a dividable interface, and whether the interface is dividable may be marked by a developer when a program is launched, and stored in the terminal.

423: If the second gesture meets a second preset condition, the terminal determines whether the first interface is a dividable interface.

If the second operation meets the first preset condition, the terminal determines whether the first interface is a dividable interface, namely, whether the first interface includes at least two dividable interfaces. The dividable interface includes the at least two dividable components. A division boundary is marked by a developer when a program is launched. The terminal determines whether the first interface is a dividable interface.

Optionally, an execution occasion of step 423 may be step 421. After determining the first interface, the terminal determines whether the first interface is a dividable interface.

424: If the first interface includes at least two dividable components, the terminal determines location information of a boundary between the dividable components.

If the first interface includes at least two dividable components, namely, if the first interface is a dividable interface, the terminal determines the location information of the boundary between the dividable components.

Optionally, the first interface includes two, three, or four dividable components, and a specific quantity is not limited. The location information of the boundary between the dividable components includes a boundary between any two adjacent dividable components on the first interface. The boundary between the dividable components may be horizontal, or may be vertical, or both horizontal and vertical, or even include an irregular boundary. This is not specifically limited herein.

Figure 5C:
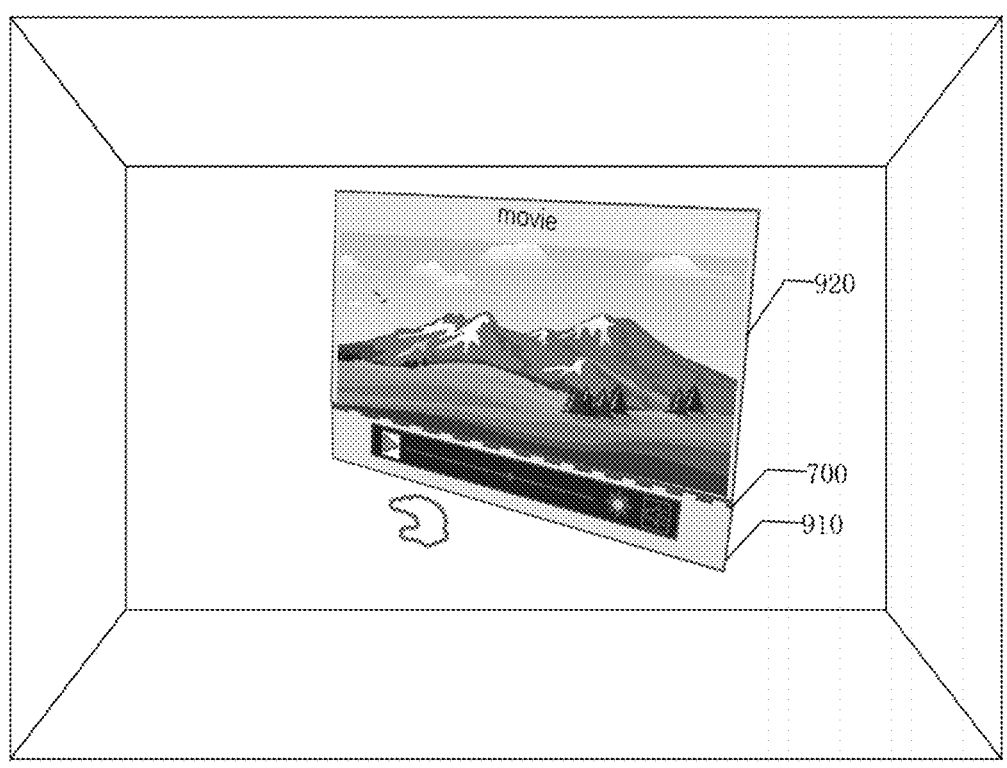
FIG. 5c is another schematic diagram of three-dimensional interface division according to an embodiment of this disclosure.

Optionally, a division line is displayed at the boundary between the dividable components of the first interface, where the division line includes the boundary between any two dividable components on the first interface. For example, FIG. 5*c* shows a division line 700.

Optionally, the dividable component is highlighted to indicate that this area is dividable.

Optionally, a feedback box is displayed at the boundary of the dividable components. The feedback box is a solid line displayed at an interface contour, and is used to limit a size of the dividable interface. For example, FIG. 5*b* shows a feedback box 920 of the video playback component 120 and a feedback box 910 of the video control component 110.

425: If the first interface includes at least two dividable components, and the second gesture meets the second preset condition, the terminal separately displays a first subinterface and a second subinterface that are obtained by dividing the first interface.

The second preset condition includes that the second gesture moves along the division line, or a distance between the second gesture and the division line is less than a preset threshold and the second gesture is parallel to the division line. It may be understood that along and parallel herein may include a specific error. For example, the second gesture includes a gesture of moving a flat palm with fingers together by a preset distance in a direction in which a palm plane extends, where the moving direction of the gesture is parallel to the boundary between the dividable components of the first interface. It should be noted that, based on different location information of the boundary between dividable components, a movement track that needs to be satisfied by a gesture is also different. If the location information of the boundary is horizontal, the movement track of the gesture is also horizontal; if the location information of the boundary is vertical, the movement track of the gesture is also vertical; and if the location information of the boundary is an irregular curve, the movement track of the gesture also needs to match the irregular curve that may be similar within a certain error range.

Optionally, the terminal detects a gesture movement distance of the user, and highlights a cut line when determining that the gesture movement direction of the user is parallel to the cut line and the distance is less than a preset threshold. Optionally, as the gesture movement distance changes, the cut line may feed back the gesture movement distance by using a color change, to indicate a current cutting progress.

Figure 5D:
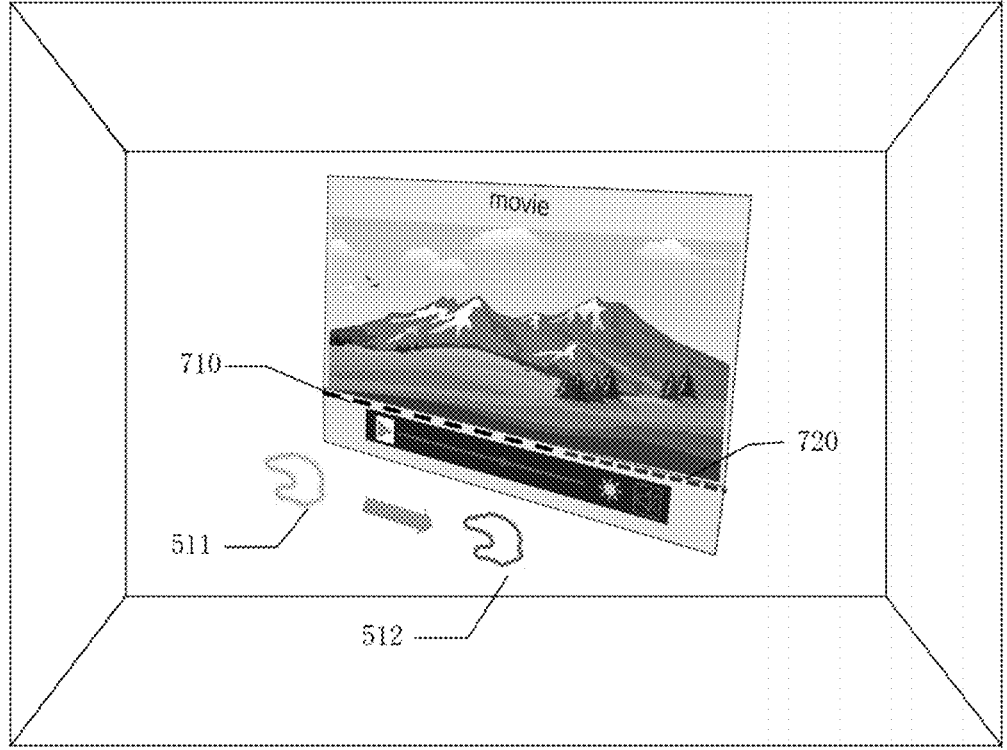
FIG. 5d is another schematic diagram of three-dimensional interface division according to an embodiment of this disclosure.

For example, as shown in FIG. 5*d*, a user gesture moves from a location 511 to a location 512, and a color of a cut part 710 of a cut line changes (in the figure, a dashed line indicating an uncut part 720 of the cut line is a densely dashed line, a dashed line indicating the cut part 710 of the cut line is a sparsely dashed line, and different dashed lines are used to represent a color change of the cut part 710 of the cut line).

If the first interface is a dividable interface and the second operation meets the second preset condition, the terminal displays, in the virtual environment, the first subinterface and the second subinterface that are obtained by dividing the first interface.

Figure 5E:
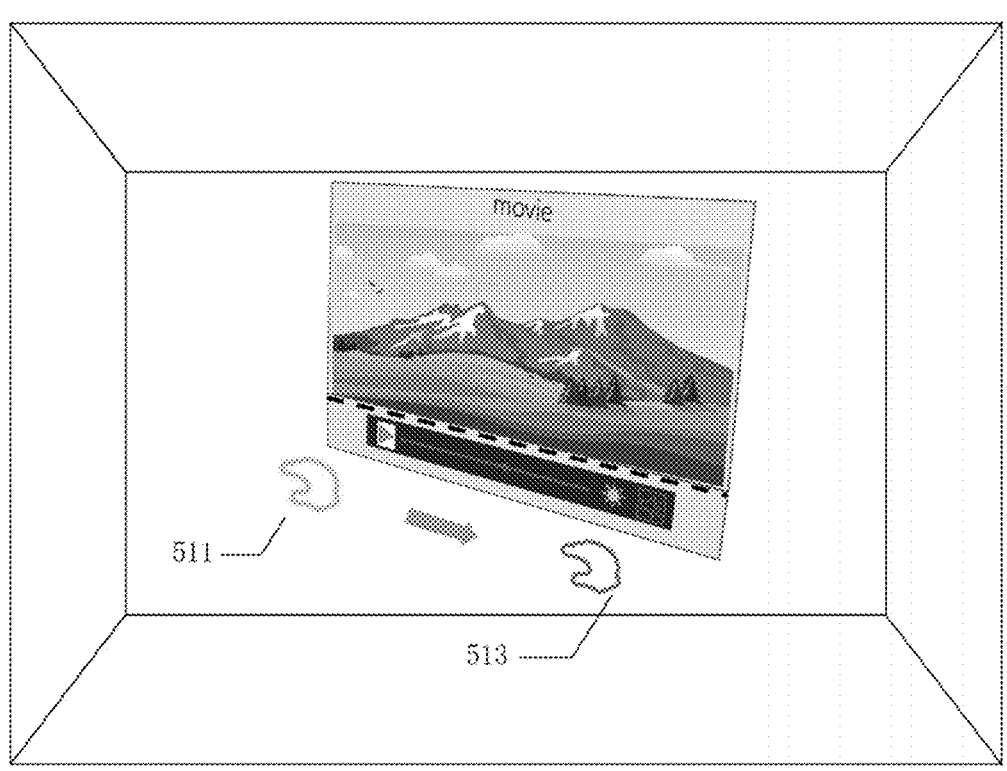
FIG. 5e is another schematic diagram of three-dimensional interface division according to an embodiment of this disclosure.

For example, as shown in FIG. 5*e*, after the terminal determines that the user keeps a cut gesture in the air from one end point (namely, the location 511) of the division line to another end point (namely, the location 513), the system determines that the cutting action is completed.

Figure 5F:
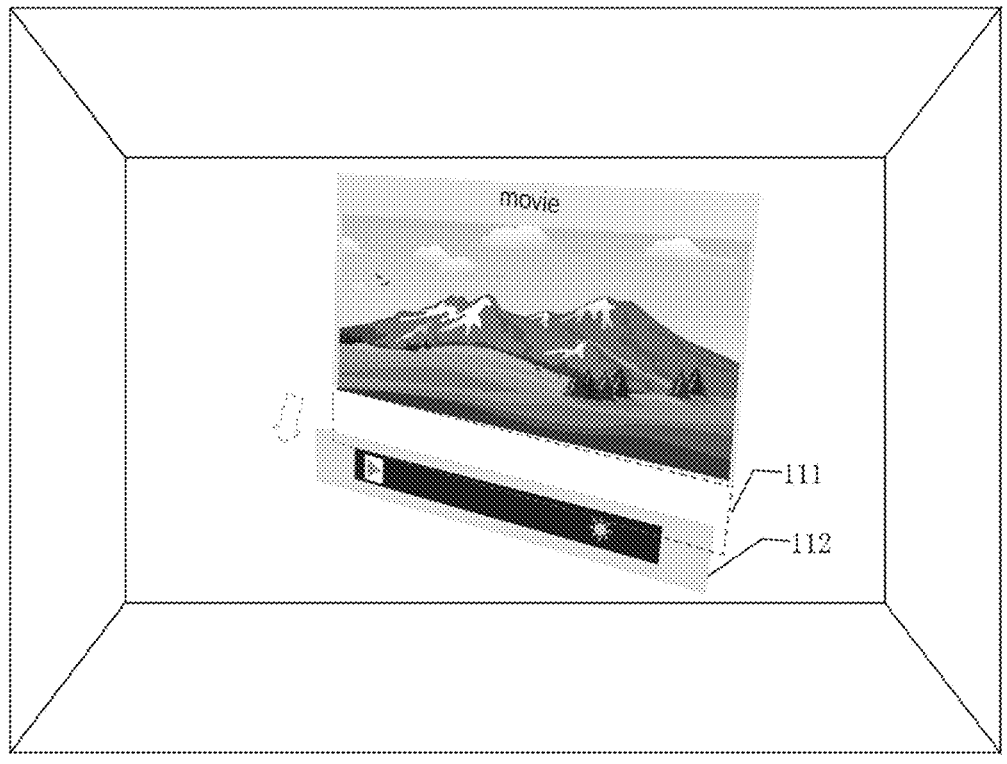
FIG. 5f is another schematic diagram of three-dimensional interface division according to an embodiment of this disclosure.
Figure 5G:
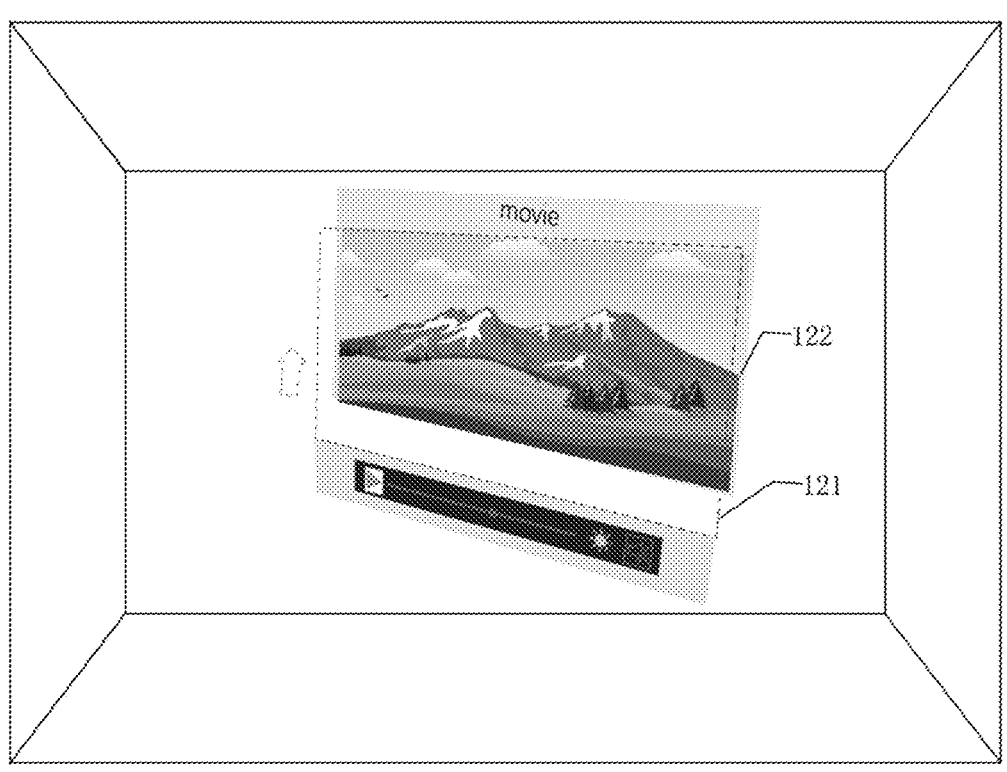
FIG. 5g is another schematic diagram of three-dimensional interface division according to an embodiment of this disclosure.
Figure 5H:
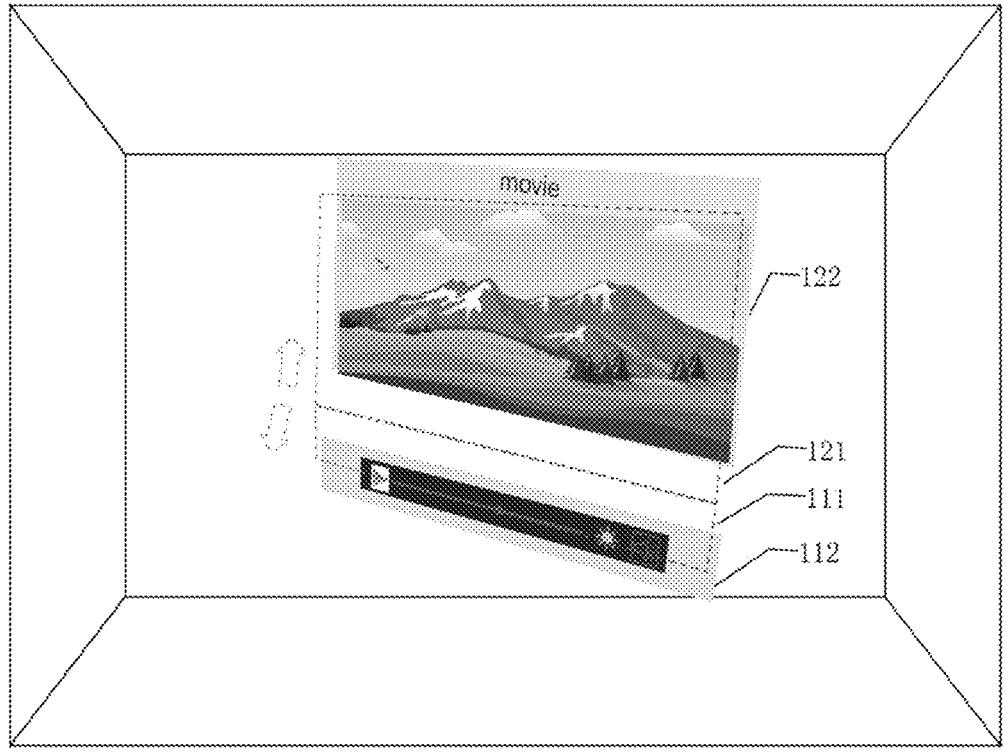
FIG. 5h is another schematic diagram of three-dimensional interface division according to an embodiment of this disclosure.

As shown in FIG. 5*f* to FIG. 5*h*, there are multiple manners in which the terminal displays, in the virtual environment, the first subinterface and the second subinterface that are obtained by dividing the first interface.

A before-division initial location of the first subinterface is a first initial location, and an after-division location is a first location. A before-division initial location of the second subinterface is a second initial location, and an after-division location is a second location.

Optionally, the first location is the same as the first initial location, and a distance between the second location and the second initial location in a direction away from the first initial location is a first preset value. For example, as shown in FIG. 5*f*, the first subinterface is the video playback component 120, and the second subinterface is the video control component 110. A location of the video playback component 120 remains unchanged, and the video control component 110 is moved downward by a preset distance from a location 111 to a location 112. In this case, a video playback area and a video control area are two independent display interfaces.

Optionally, the second location is the same as the second initial location, and a distance between the first location and the first initial location in a direction away from the second initial location is a second preset value. For example, as shown in FIG. 5*g*, a location of the video control component 110 remains unchanged, and the video playback component 120 is moved upward by a preset distance from a location 121 to a location 122. Therefore, the video playback component 120 and the video control component 110 are spaced and displayed as two independent interfaces.

Optionally, a distance between the first location and the first initial location in a direction away from the second initial location is a third preset value, and a distance between the second location and the second initial location in a direction away from the first initial location is a fourth preset value. For example, as shown in FIG. 5*h*, the video playback component 120 is moved upward by a preset distance from the location 121 to the location 122, and the video control component 110 is moved downward by a preset distance from the location 111 to the location 112. Therefore, the video playback component 120 and the video control component 110 are spaced and displayed as two independent interfaces.

Optionally, when the first interface is divided into at least two subinterfaces, there are multiple layout manners, and the layout manners may be a combination of one or more of moving up and down, moving left and right, or moving forward and backward. This is not specifically limited herein.

Optionally, location information of the first subinterface on the first interface and location information of the second subinterface on the first interface during cutting are recorded. The location information is, for example, coordinate data, and may be used to determine a relative location between the first subinterface and the second subinterface when the first subinterface and the second subinterface are subsequently combined.

The first subinterface and the second subinterface that are obtained by dividing the first interface may be separately displayed and controlled, and the control includes adjusting an interface size, moving, rotating, combining, operating a functional component on the interface, and the like. This is not specifically limited herein.

II. Dividable Component Movement

Figure 6:
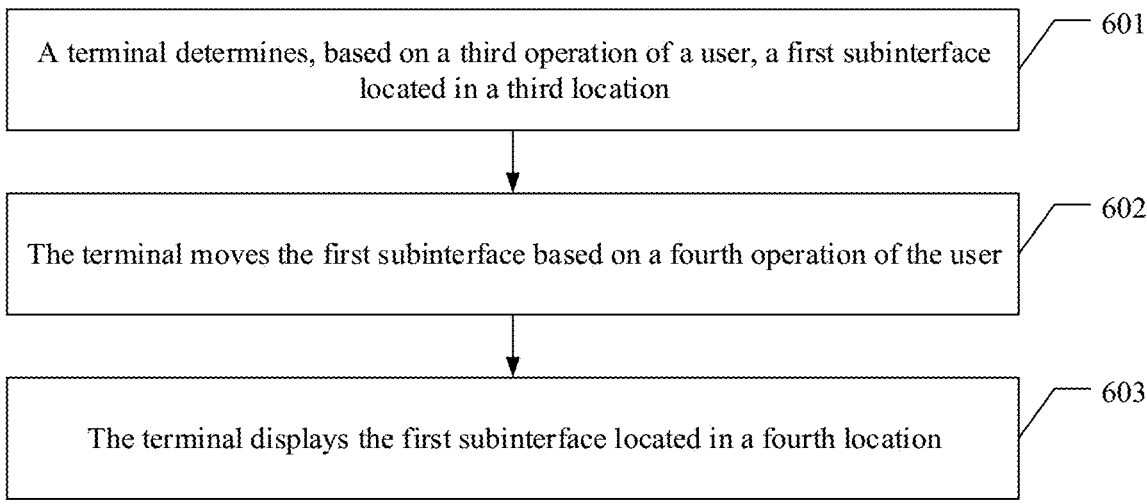
FIG. 6 is a schematic diagram of an embodiment of a three-dimensional interface movement method according to an embodiment of this disclosure.

The following describes a subinterface moving method. FIG. 6 is a schematic diagram of an embodiment of a subinterface control method according to an embodiment of this disclosure.

601: A terminal determines, based on a third operation of a user, a first subinterface located in a third location.

The terminal may determine the first subinterface based on the third operation of the user, where a location of the first subinterface is the third location.

Optionally, if a distance between a third gesture operation and the first subinterface is less than the preset threshold, the first subinterface is determined.

Figure 7A:
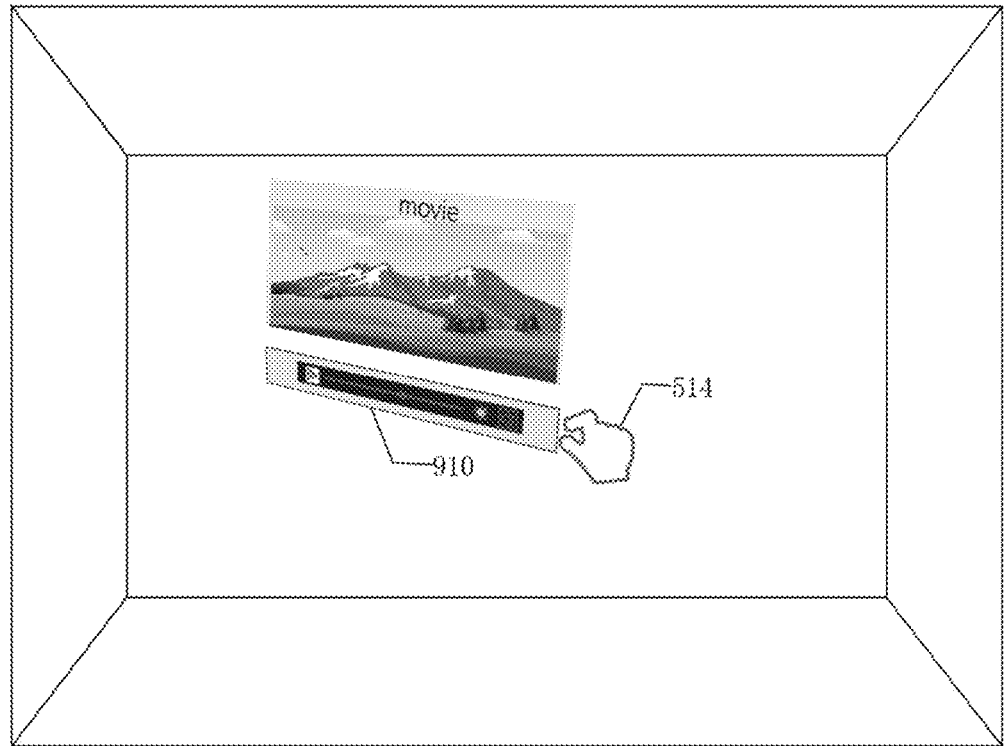
FIG. 7a is one schematic diagram of three-dimensional interface movement according to an embodiment of this disclosure.

Optionally, after determining the first subinterface, the terminal may display a feedback identifier. As shown in FIG. 7a, the feedback identifier appears on a contour of a dividable component. The feedback identifier includes a feedback box for indicating a size of a selected interface or a highlighting component for feeding back to the user that the interface is selected.

As shown in FIG. 7a, a distance between a location 514 of a user gesture and the first subinterface is less than the preset threshold. Therefore, the video control component 110 is determined, and a feedback identifier 910 appears on a contour of the video control component 110.

602: The terminal moves the first subinterface based on a fourth operation of the user.

Optionally, the fourth gesture includes keeping a "pinch grip" gesture and moving, where the "pinch grip" gesture is a gesture in which a thumb and an index finger change from a separated state to a touch state, and the "pinch grip" gesture requires that a distance between the user gesture and the first subinterface be less than or equal to the preset threshold.

Optionally, the fourth gesture includes keeping an "open palm" gesture and moving. The "open palm" gesture is a hand state in which five fingers are close together and a palm is upward. It should be noted that, in a moving process of the "open palm" gesture, a distance between the user gesture and the first subinterface is not limited, and the first subinterface follows the user gesture.

The terminal determines the first subinterface selected by the user by using the "pinch grip" gesture, and records a relative displacement of a hand (for example, an initial location of the hand is (x1, y1, z1), a first location is (x2, y2, z2), and a relationship between the initial location and the first location is used to describe the relative displacement, for example, a 1 cm movement in a forward direction of the x-axis, a 1 cm movement in a forward direction of the y-axis, and a 1 cm movement in a forward direction of the z-axis). The location of the component is displayed by the relative displacement based on a preset proportion relationship, and a display effect is that the first subinterface moves with a change of the location of the gesture.

603: The terminal displays the first subinterface located in a fourth location.

The terminal stops moving the first subinterface based on a fifth operation of the user, and the first subinterface stops moving. When the fifth operation is performed, a location of the first interface is the fourth location.

The terminal stops moving the first subinterface based on the fifth operation of the user. Optionally, the fifth operation includes canceling the fourth operation, and may be specifically that a gesture of the fourth operation changes, or a distance between the user gesture and the moving interface is greater than or equal to the preset threshold. This is not specifically limited herein.

Optionally, if the first subinterface is moved by using the "pinch grip" gesture, and the "pinch grip" gesture is canceled, the first subinterface may stop moving, and the first subinterface stays in a location of the first subinterface when the "pinch grip" gesture is canceled on the terminal.

Optionally, if the first subinterface is moved by using the "open palm" gesture, and the "open palm" gesture is canceled, the first subinterface may stop moving, and the first subinterface stays in a location of the first subinterface when the "open palm" gesture is canceled on the terminal.

Figure 7B:
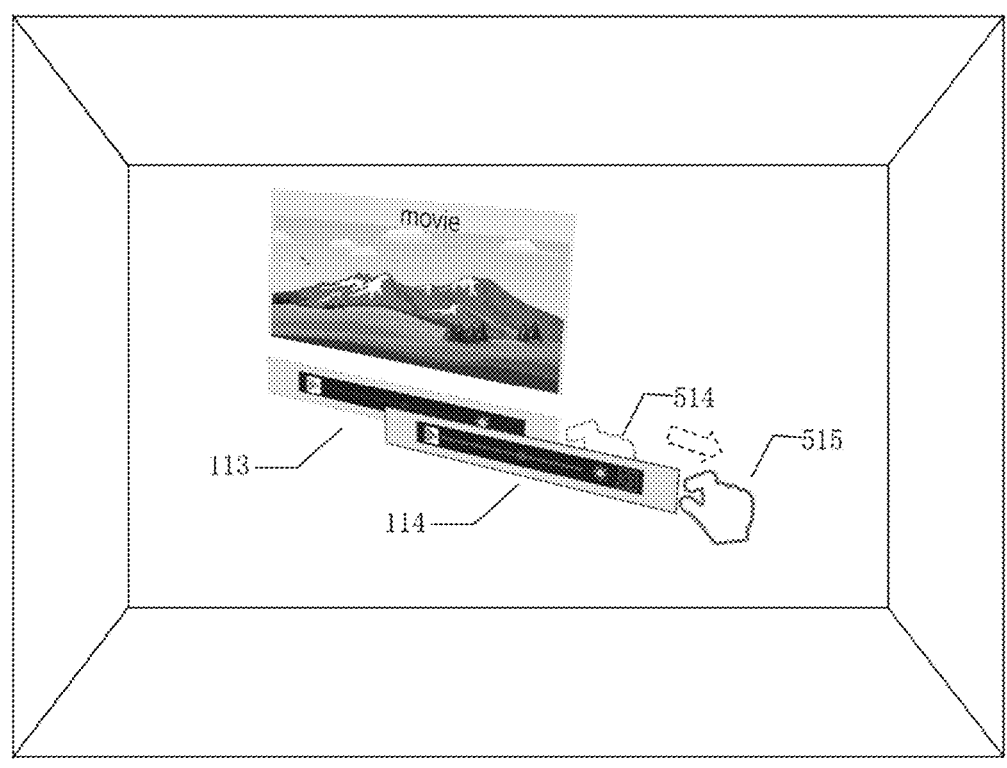
FIG. 7b is another schematic diagram of three-dimensional interface movement according to an embodiment of this disclosure.
Figure 7C:
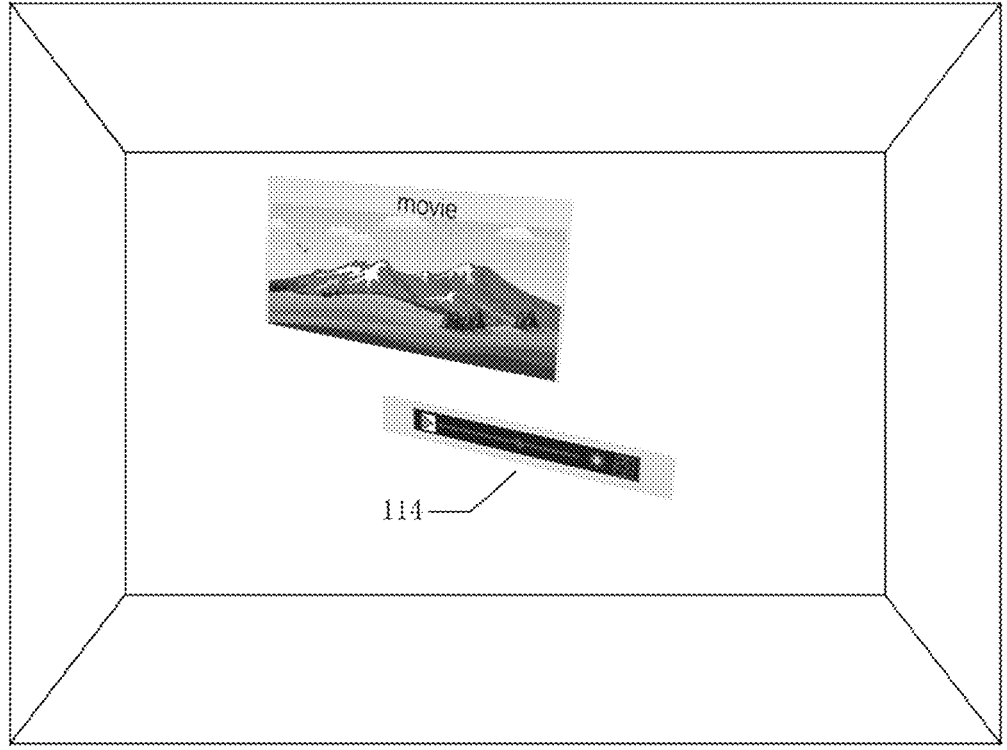
FIG. 7c is another schematic diagram of three-dimensional interface movement according to an embodiment of this disclosure.

Example 1: Refer to FIG. 7b and FIG. 7c. As shown in FIG. 7b, the "pinch grip" gesture moves from the location 514 to the location 515, and the video control component 110 accordingly moves from a location 113 to a location 114. If the user cancels the "pinch grip" gesture, the video control component 110 stops moving. As shown in FIG. 7c, the video control component 110 stays in the location 114.

Figure 7D:
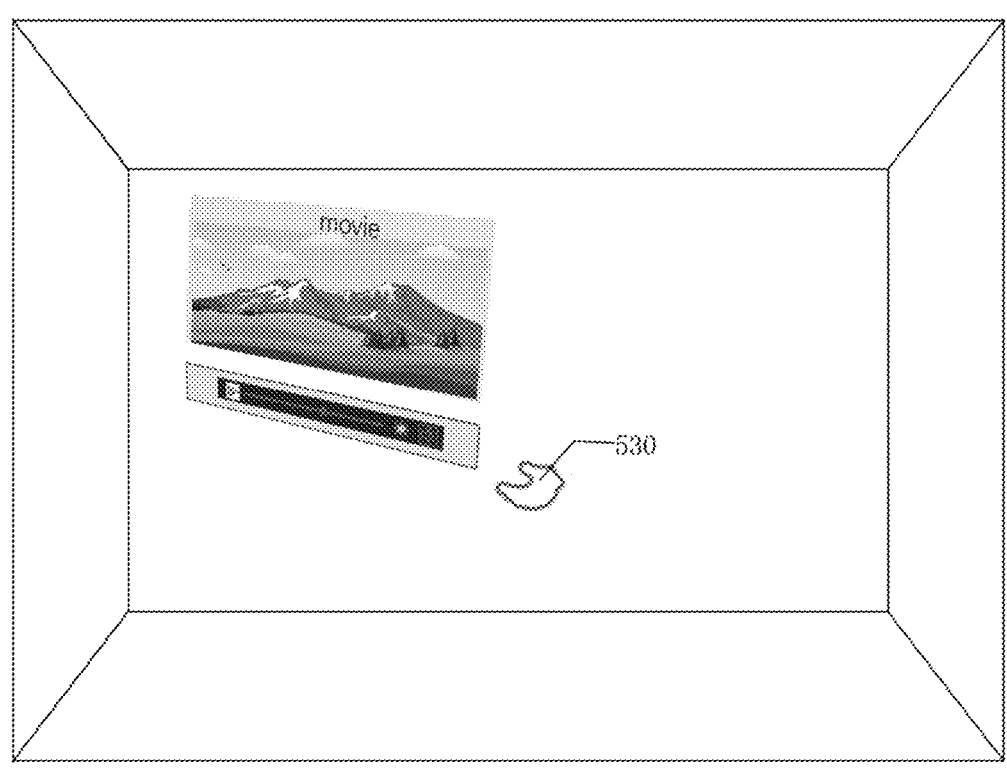
FIG. 7d is another schematic diagram of three-dimensional interface movement according to an embodiment of this disclosure.
Figure 7E:
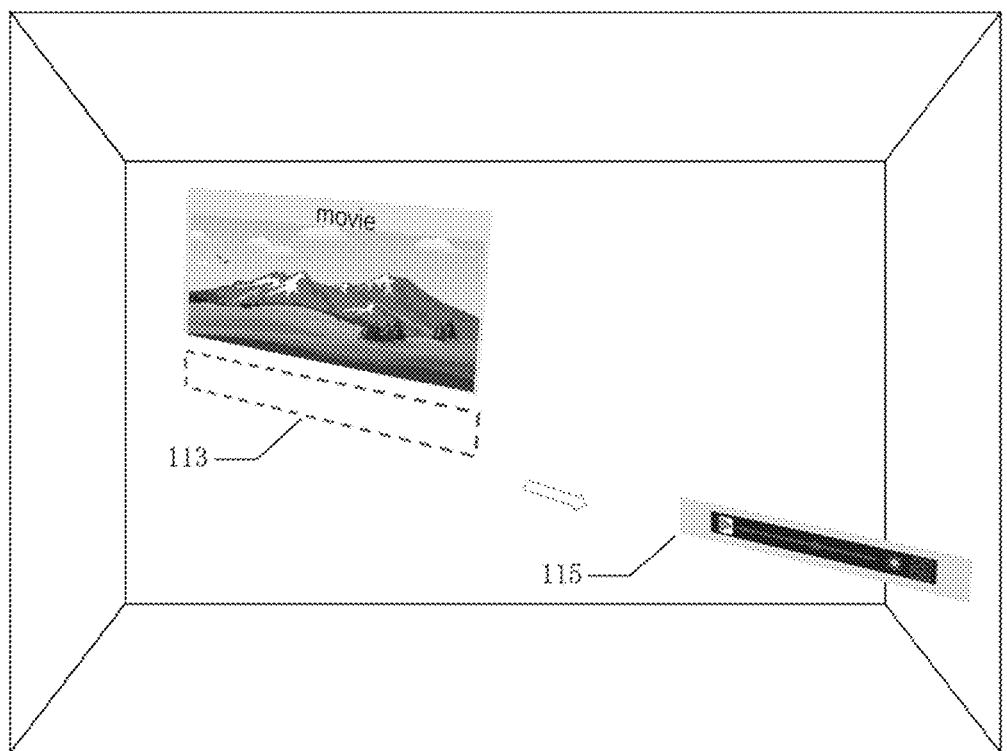
FIG. 7e is another schematic diagram of three-dimensional interface movement according to an embodiment of this disclosure.

Example 2: Refer to FIG. 7d and FIG. 7e. Considering that in some application scenarios, the user needs to move the interface by a large distance, it is difficult to perform an operation of keeping the "pinch grip" gesture and moving. As shown in FIG. 7d, the interface may follow an "open palm" gesture 530. In a movement process, a distance between the user gesture and the interface is not limited, and the interface moves along with the "open palm" gesture. As shown in FIG. 7e, the video control component 110 moves from the location 113 to a location 115.

Figure 8:
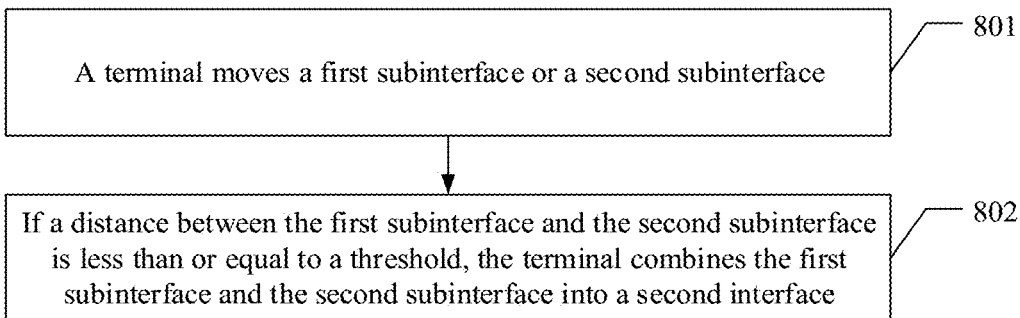
FIG. 8 is a schematic diagram of an embodiment of a three-dimensional interface combination method according to an embodiment of this disclosure.

FIG. 8 is a schematic diagram of an embodiment of combination of a plurality of subinterfaces according to an embodiment of this disclosure.

801: A terminal moves a first subinterface and/or a second subinterface.

The terminal moves the first subinterface or the second subinterface.

Optionally, the terminal simultaneously moves the first subinterface and the second subinterface.

802: If a distance between the first subinterface and the second subinterface is less than or equal to a threshold, the terminal combines the first subinterface and the second subinterface into a second interface.

For example, when a user simultaneously "pinches" and moves the first subinterface and the second subinterface by two hands on the terminal, and it is determined that the distance between the first subinterface and the second subinterface is less than or equal to a preset threshold, the terminal combines the first subinterface and the second subinterface into the second interface. Optionally, a layout of the second interface may be the same as or may be different from a layout of the first interface. The second interface returns based on before-division location information, for example, coordinate values, that is recorded by the terminal and that is of the first subinterface and the second subinterface, so that the combined second interface is the same as the before-division first interface.

Optionally, the relative location of the first subinterface and the second subinterface on the second interface is determined based on the location information of the first subinterface and the second subinterface on the first interface when the first interface is divided.

Optionally, if the distance between the first subinterface and the second subinterface is less than or equal to the preset threshold, a bounding box is displayed at an interface contour, or both the first subinterface and the second subinterface are highlighted.

Figure 9A:
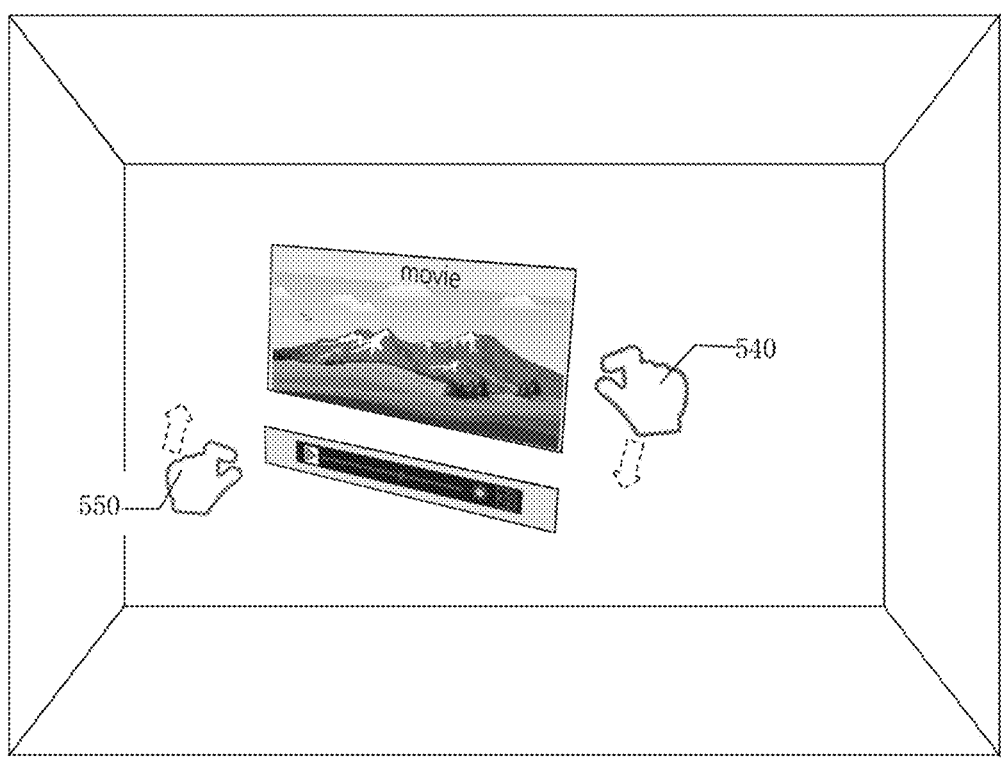
FIG. 9a is one schematic diagram of three-dimensional interface combination according to an embodiment of this disclosure.

For example, as shown in FIG. 9a, the terminal determines the video control component 110 based on a first "pinch grip" gesture 550, and determines the video playback component 120 based on a second "pinch grip" gesture 540. The video control component 110 and the video playback component 120 are moved to approach each other by using a "pinch grip" gesture.

Figure 9B:
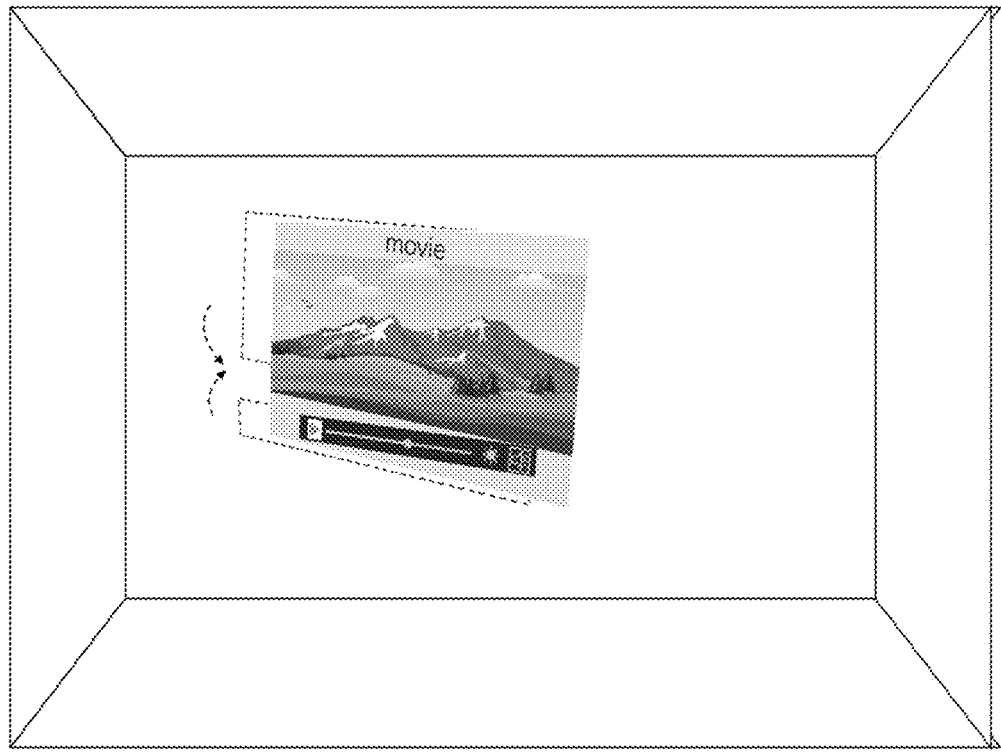
FIG. 9b is another schematic diagram of three-dimensional interface combination according to an embodiment of this disclosure.

As shown in FIG. 9b, when a distance between the video control component 110 and the video playback component 120 is less than or equal to a preset threshold, the first subinterface and the second subinterface are combined into the second interface for display. Optionally, although not shown in the figure, when the distance between the video control component 110 and the video playback component 120 is less than or equal to the preset threshold, the boundary box may alternatively be displayed at contours of the first subinterface and the second subinterface to feed back information that the user interfaces are to be combined.

III. Combination and Control of Dividable Components Among a Plurality of Applications FIG. 10 is a schematic diagram of a combination method of subinterfaces of a plurality of applications according to an embodiment of this disclosure.

1001: A terminal displays subinterfaces of a plurality of applications in a virtual environment.

The terminal may display interfaces of two or more applications, including a first subinterface and a second subinterface that are obtained by dividing a first interface of a first application, and a third subinterface and a fourth subinterface that are obtained by dividing a second interface of a second application.

Figure 11A:
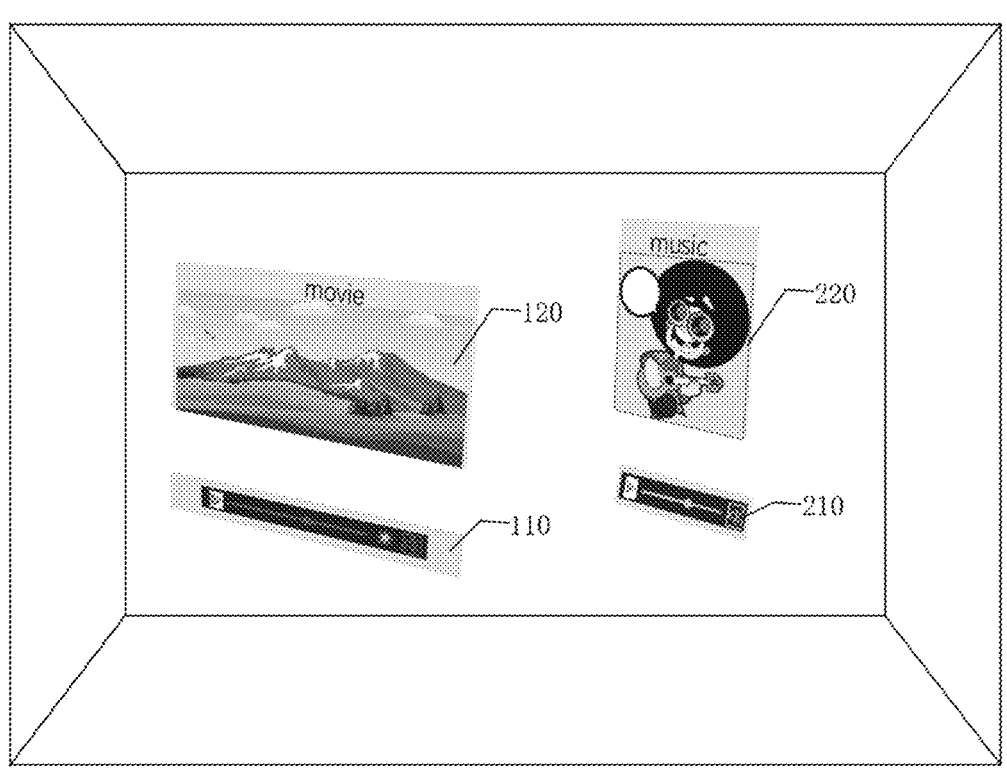
FIG. 11a is one schematic diagram of three-dimensional interface combination according to an embodiment of this disclosure.

For example, as shown in FIG. 11*a*, the terminal displays a video player display interface and a music playback interface that are separated. The video player display interface is divided into a video control component 110 and a video playback component 120, and the music play interface is divided into a music control component 210 and a music play component 220. Specifically, the video playback component 120 includes information of video playback content, and the music play component 220 includes information of music play content. The video control component 110 includes play, pause, a progress bar, and a brightness component, and the music control component 210 includes play, pause, and a progress bar component.

1002: A terminal moves the first subinterface or the third subinterface.

The terminal may move the first subinterface and the third subinterface based on a user operation. Optionally, the terminal simultaneously moves the first subinterface and the third subinterface.

Figure 11B:
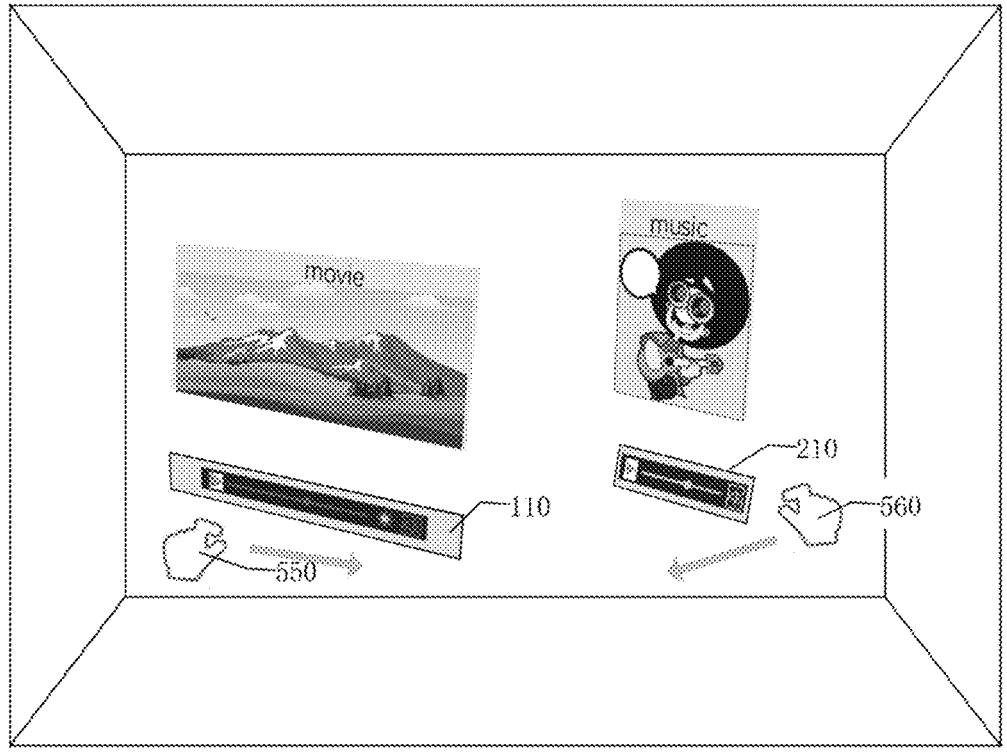
FIG. 11b is another schematic diagram of three-dimensional interface combination according to an embodiment of this disclosure.

For example, as shown in FIG. 11*b*, the system detects and identifies the first "pinch grip" gesture 550, and determines the video playback controller 110, where the video playback controller 110 moves along with the first "pinch grip" gesture 550. In addition, a second gesture 560 determines the music play controller 210, where the music play controller 210 moves along with the second gesture 560. Optionally, a feedback identifier is displayed at contours of the video playback controller 110 and the music play controller 210, and may be a feedback box or a highlighting component.

1003: If a distance between the first subinterface and the third subinterface is less than or equal to a threshold, the terminal combines the first subinterface and the third subinterface for display.

If the distance between the first subinterface and the third subinterface is less than or equal to a preset threshold, and the first subinterface and the third subinterface meet a preset condition, the first subinterface and the third subinterface are combined into a fifth subinterface, and the fifth subinterface is displayed.

The preset condition includes that the first subinterface and the third subinterface include components of a same type.

Figure 11C:
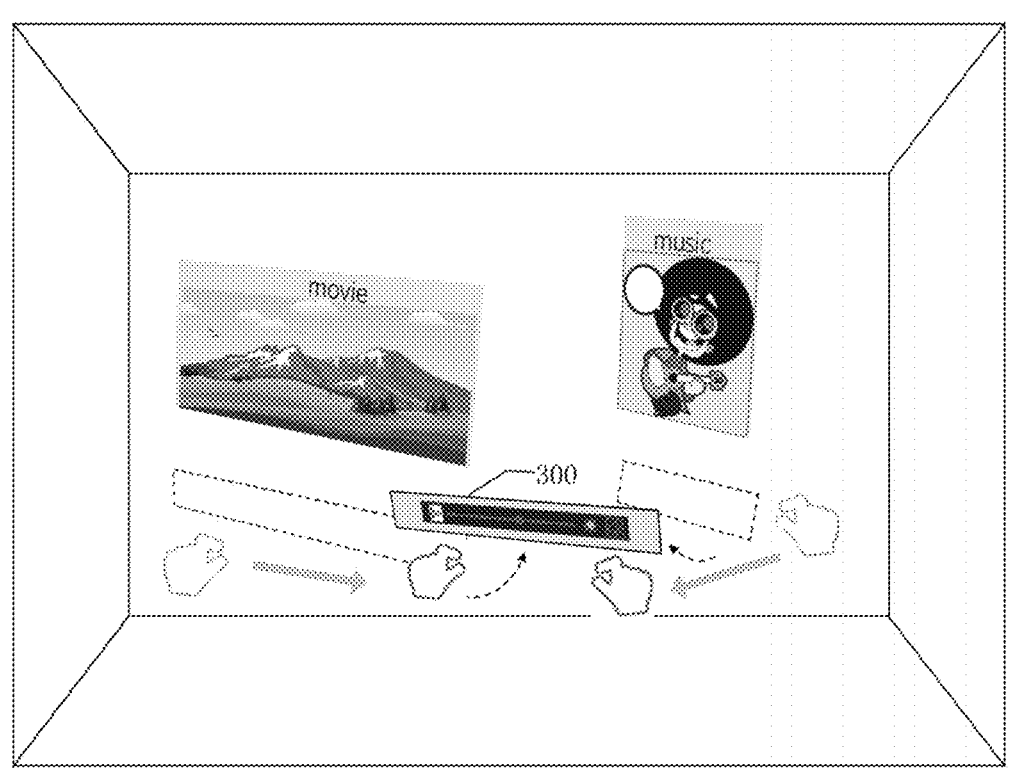
FIG. 11c is another schematic diagram of three-dimensional interface combination according to an embodiment of this disclosure.
Figure 11D:
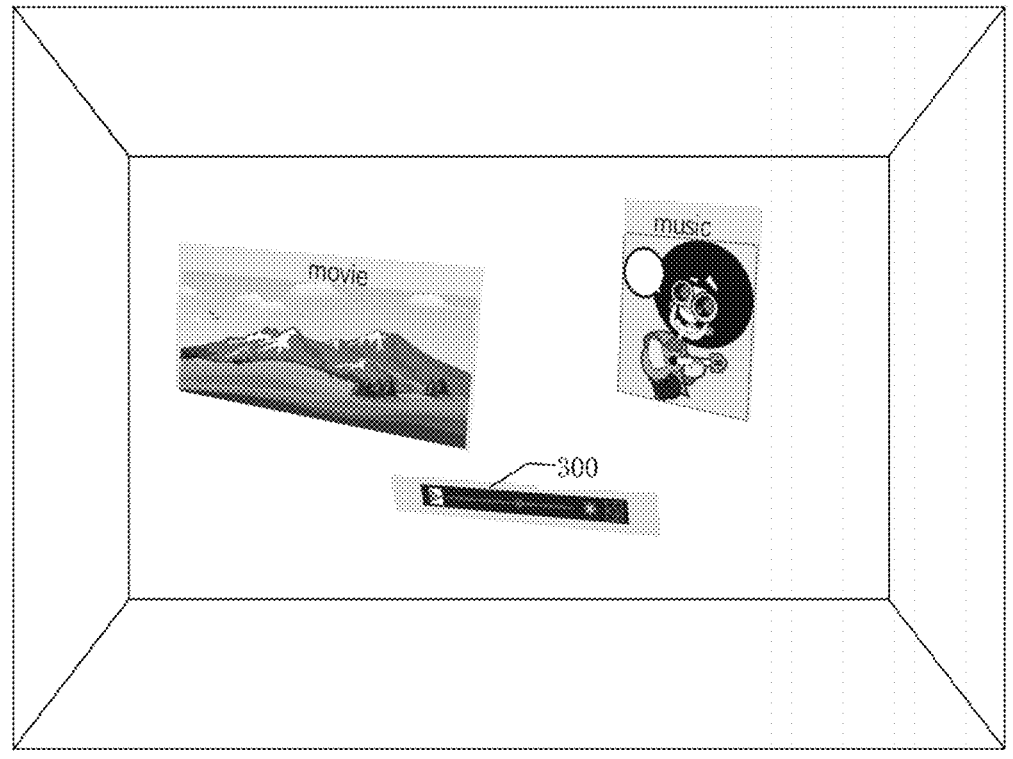
FIG. 11d is another schematic diagram of three-dimensional interface combination according to an embodiment of this disclosure.

For example, as shown in FIG. 11*c*, the first subinterface is the video playback controller 110, and the third subinterface is the music play controller 210. The two controllers are combined into the fifth subinterface, namely, a multi-functional controller 300, by moving the two subinterfaces close to each other. A combined display interface is shown in FIG. 11*d*.

The system determines that the user simultaneously releases the pinch grip of both hands and combines the two controllers. Functions of the two controllers to be combined are determined. If the functions are the same, one of the functions is reserved. If the functions are different, the functions are combined. In this embodiment, functions of the video playback controller and the music play controller are consistent, including functions such as play, previous, next, and a progress bar. After the combination is completed, one of the controllers may be reserved as a combined control for multi-task control. If functions of the two controllers are inconsistent, for example, a video player and a three-dimensional modeling controller (rotating, zooming, rotating, and the like), all functional components in the two controllers are deduplicated and combined into a new combined control.

The terminal may control the combined fifth subinterface based on a user operation. Optionally, the terminal may further perform combined display on the first subinterface and the third subinterface based on a voice of the user. For example, when the user separately "pinches" the video playback controller and the music play controller, and sends a voice instruction of "To combine controllers", the video playback controller and the music play controller may be combined for display.

1004: The terminal displays an indication identifier based on a user operation.

Step 340 is performed after the control combination in 330 is completed.

Because the fifth subinterface may be configured to control the first application and the second application, to distinguish control objects, after determining the fifth subinterface based on the user operation, the terminal may display the indication identifier, where the indication identifier is used to determine an interface currently associated with the fifth subinterface. Optionally, the indication identifier is displayed at an edge of the fifth subinterface. Optionally, the indication identifier is an arrow displayed above the fifth subinterface, and the arrow is perpendicular to an upper boundary of the fifth subinterface and is in a direction away from the fifth subinterface.

Optionally, the fifth subinterface is determined based on the "pinch grip" gesture of the user on the fifth subinterface, and the indication identifier is displayed.

Figure 11E:
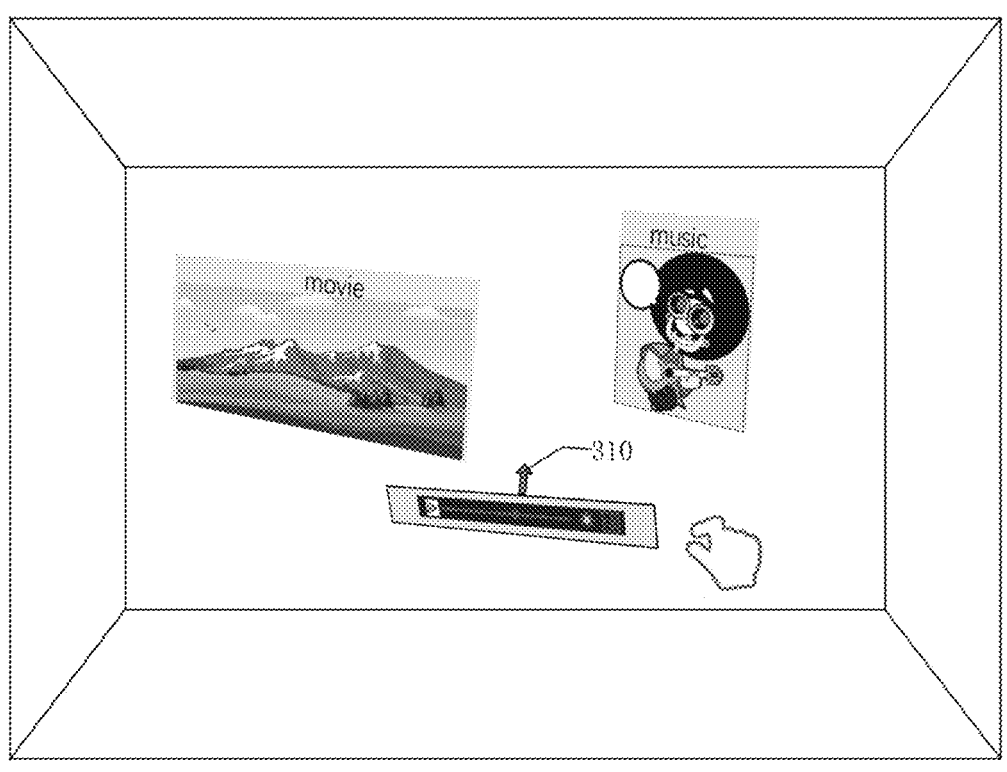
FIG. 11e is another schematic diagram of three-dimensional interface combination according to an embodiment of this disclosure.

For example, as shown in FIG. 11*e*, based on the "pinch grip" gesture of the multi-functional controller 300, the indication identifier, namely, an arrow 310, is displayed in a vertical upper boundary and in an outward direction at a central location of an upper boundary of the multi-functional controller 300, where a direction indicated by the arrow 310 is used to determine an interface currently controlled by the multi-functional controller 300.

1005: If the indication identifier points to the second subinterface, the terminal controls the first application based on a user operation performed on the fifth subinterface.

The terminal may move the fifth subinterface based on the user operation, and an indication identifier of the fifth subinterface moves along with the fifth subinterface. If the indication identifier points to the second subinterface, the terminal determines that a control object of the fifth subinterface is the first application corresponding to the second subinterface.

Figure 11F:
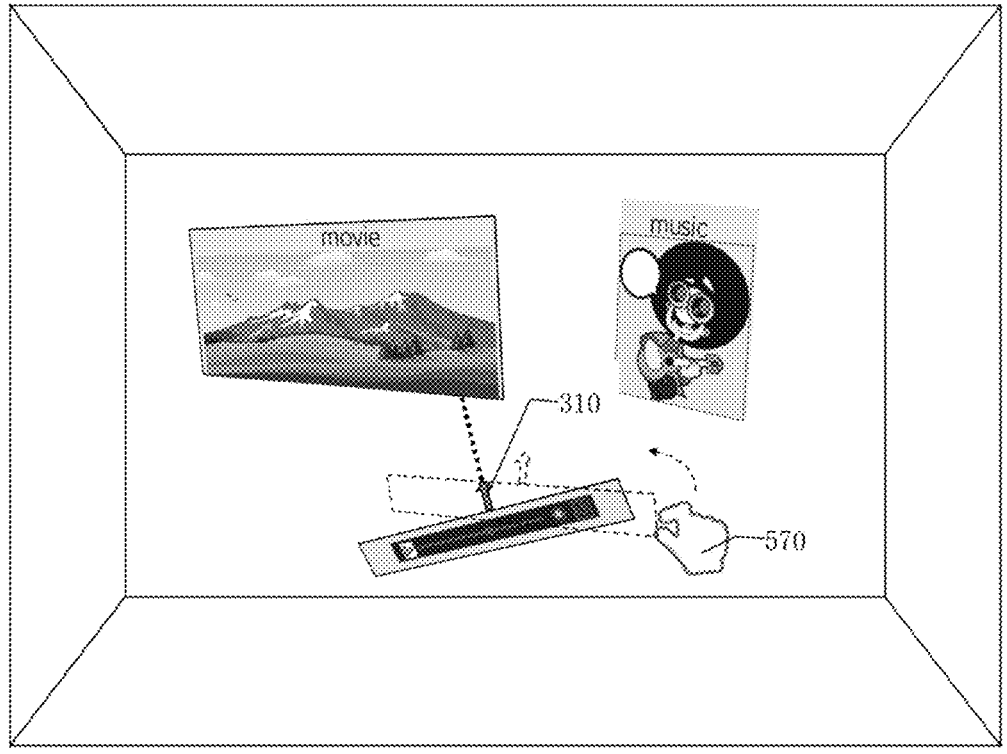
FIG. 11f is another schematic diagram of three-dimensional interface combination according to an embodiment of this disclosure.
Figure 11G:
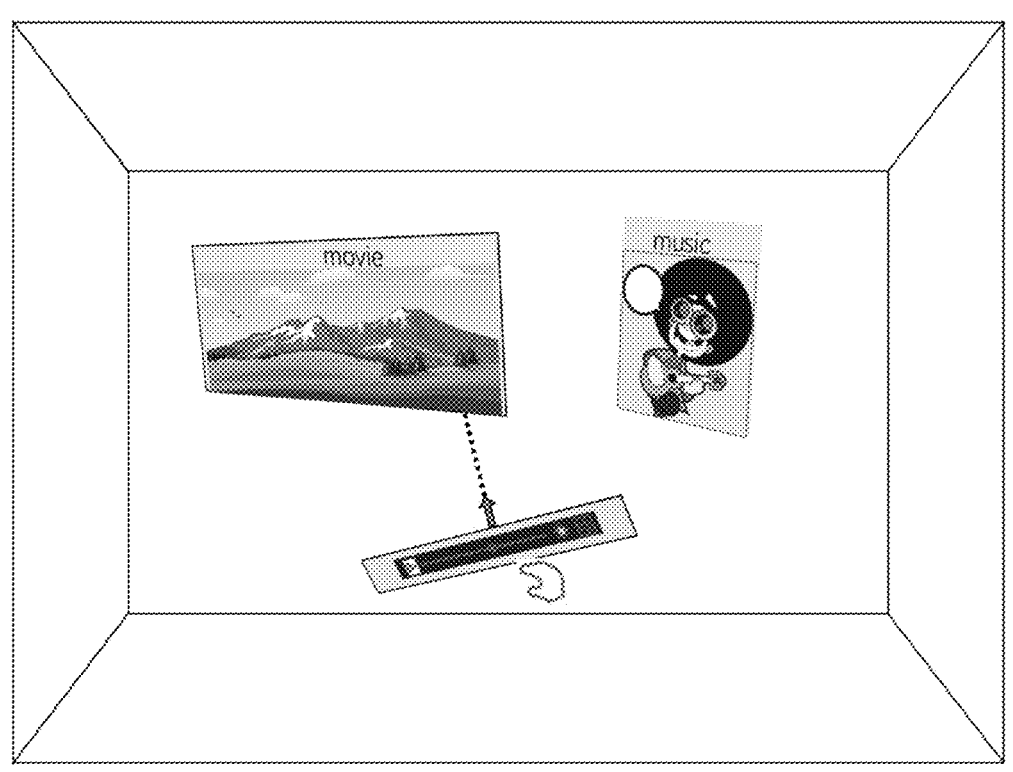
FIG. 11g is another schematic diagram of three-dimensional interface combination according to an embodiment of this disclosure.

For example, as shown in FIG. 11*f*, the multi-functional controller 300 is moved based on the gesture 570. If the arrow 310 aims at the video playback component 120, specifically if an extension line of the arrow overlaps with the video playback component 120, the multi-functional controller 300 is configured to control an application, namely, a video application, corresponding to the video playback component 120. As shown in FIG. 11g, the video application is controlled by using a control component in the multi-functional controller 300.

Optionally, an aimed video playback task interface displays identification feedback, where the identification feedback includes a feedback box, and indicates an area in which the second subinterface is controlled; or the identification feedback is highlighting the second subinterface, or the like.

1006: If the indication identifier points to the fourth subinterface, the terminal controls the second application based on the user operation performed on the fifth subinterface.

Similarly, if the indication identifier points to the fourth subinterface, the terminal determines that the control object of the fifth subinterface is the second application corresponding to the fourth subinterface.

Figure 11H:
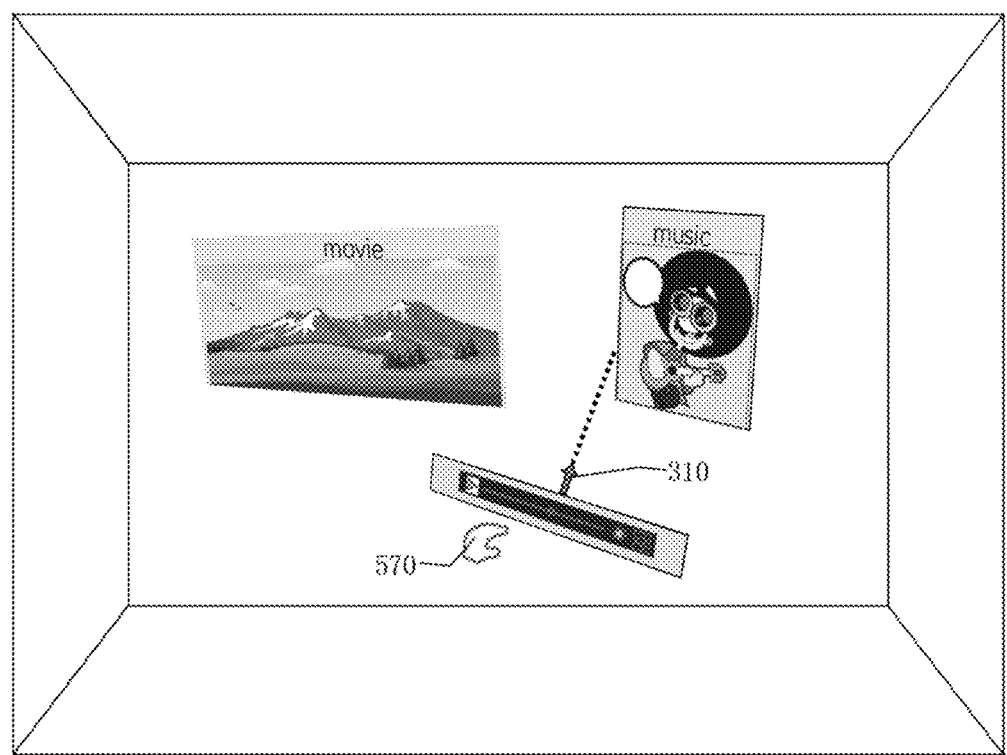
FIG. 11h is another schematic diagram of three-dimensional interface combination according to an embodiment of this disclosure.

For example, as shown in FIG. 11h, the multi-functional controller 300 is moved based on the gesture 570. If the arrow 310 aims at the music play component 220, the multi-functional controller 300 is configured to control an application, namely, a music application, corresponding to the music play component 220. It may be understood that, when there are more than two control components that can be combined, a selection instruction, for example, "To combine controllers of video and music", for a control component that needs to be combined in the voice instruction may be further identified.

Optionally, the fifth subinterface may be further controlled in a voice control manner, and the voice instruction needs to include a specific control action (such as play or pause) and a target application (such as a video application) to be controlled. For example, if the user sends an instruction of "To play a video", steps of alignment and clicking on a virtual interface may be omitted. Because a main purpose of step 340 and step 350 is to select a target control component and a control function, a line-of-sight aiming manner or a brain wave detection manner may also be used in addition to a voice manner. For example, if the user first looks at a video playback interface, and then looks at a play button of the control component, the user may perform a play operation on the video playback interface.

Figure 12:
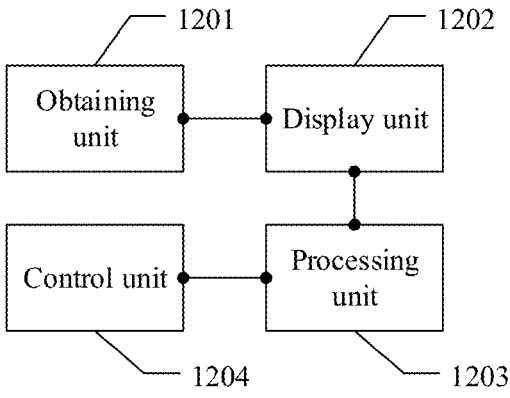
FIG. 12 is a schematic diagram of an embodiment of a terminal according to an embodiment of this disclosure.

The foregoing describes the interface control method provided in this disclosure, and the following describes a terminal that implements the interface control method. FIG. 12 is a schematic diagram of an embodiment of a terminal according to an embodiment of this disclosure.

Only one or more of the modules in FIG. 12 may be implemented by using software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

The terminal includes:

an obtaining unit 1201, configured to obtain a first operation on a first interface displayed in a virtual environment, where the first interface includes at least two dividable components; and a display unit 1202, configured to display, in the virtual environment based on division location information in response to the first operation, a first subinterface and a second subinterface that are obtained by dividing the first interface, where the first subinterface includes a first dividable component of the at least two dividable components, the second subinterface includes a second dividable component adjacent to the first dividable component, and the division location information includes a boundary between the first dividable component and the second dividable component.

Optionally, the first operation includes first voice information obtained by the terminal by using a voice collection apparatus, or a first gesture obtained by the terminal by using a sensor system.

Optionally, the first gesture includes: moving a flat palm with fingers together by a preset distance in a first direction in which a palm plane extends, where the first direction in which the palm plane extends is parallel to the boundary.

Optionally, the display unit 1202 is further configured to display a division line on a boundary between the first dividable component and the second dividable component.

Optionally, the display unit 1202 is specifically configured to:

display the first subinterface in a first location, and display the second subinterface in a second location.

The first location is the same as a first initial location, a distance between the second location and a second initial location in a direction away from the first initial location is a first preset value, the first initial location is a location of the first subinterface on the first interface when the terminal obtains a first instruction, and the second initial location is a location of the second subinterface on the first interface when the terminal obtains the first instruction; or the second location is the same as a second initial location, and a distance between the first location and a first initial location in a direction away from the second initial location is a second preset value; or a distance between the first location and a first initial location in a direction away from a second initial location is a third preset value, and a distance between the second location and the second initial location in a direction away from the first initial location is a fourth preset value.

Optionally, the terminal further includes:

a processing unit 1203, configured to move the first subinterface in response to a second operation on the first subinterface.

Optionally, the second operation includes: a pinch grip gesture pointing to the first subinterface, where the pinch grip gesture includes a hand state in which a thumb approaches at least one of four fingers, and keeping the pinch grip gesture and moving; or touching and holding the first subinterface and moving; or keeping an open palm gesture and moving, where the open palm gesture includes a hand state with fingers together and a palm up.

Optionally, the terminal further includes:

a processing unit 1203, configured to move the first subinterface.

The display unit 1202 is further configured to: if a distance between the first subinterface and the second subinterface is less than a first threshold, display, in the virtual environment, a second interface obtained by combining the first subinterface and the second subinterface, where a layout of the second interface is the same as or different from a layout of the first interface.

Optionally, the terminal further includes:

The display unit 1202 is further configured to display a third interface in the virtual environment, where the first interface is an interface of a first application, and the third interface is an interface of a second application.

The processing unit 1203 is further configured to move the first subinterface and/or the third interface.

The display unit 1202 is further configured to: if a distance between the first subinterface and the third interface is less than a second threshold, display, in the virtual environment, a fourth interface obtained by combining the first subinterface and the third interface.

Optionally, the display unit 1202 is further configured to display a third subinterface and a fourth subinterface in the virtual environment, where the third subinterface and the fourth subinterface are obtained by dividing the third interface, the first interface is the interface of the first application, and the third interface is the interface of the second application.

The processing unit 1203 is further configured to move the first subinterface and/or the third subinterface.

The display unit 1202 is further configured to: if a distance between the first subinterface and the third subinterface is less than a third threshold, display, in the virtual environment, a fifth subinterface obtained by combining the first subinterface and the third subinterface.

Optionally, the first subinterface includes a first icon for controlling a first function of the first application. The third subinterface includes a second icon for controlling a second function of the second application. The first function is the same as the second function.

The fifth subinterface includes a third icon. The third icon is used to control the first function of the first application and the second function of the second application.

Optionally, the first subinterface is an input interface of the first application. The second subinterface is an output interface of the first application. The third subinterface is an input interface of the second application. The fourth subinterface is an output interface of the second application.

The display unit 1202 is further configured to display an indication identifier on an edge of the fifth subinterface, where the indication identifier is used to determine an application currently controlled by the fifth subinterface.

The terminal further includes:

a control unit 1204, configured to: when the indication identifier points to the second subinterface, control the first application based on an input operation performed on the fifth subinterface.

The control unit 1204 is further configured to: when the indication identifier points to the fourth subinterface, control, by the terminal, the second application based on an input operation performed on the fifth subinterface.

Figure 13:
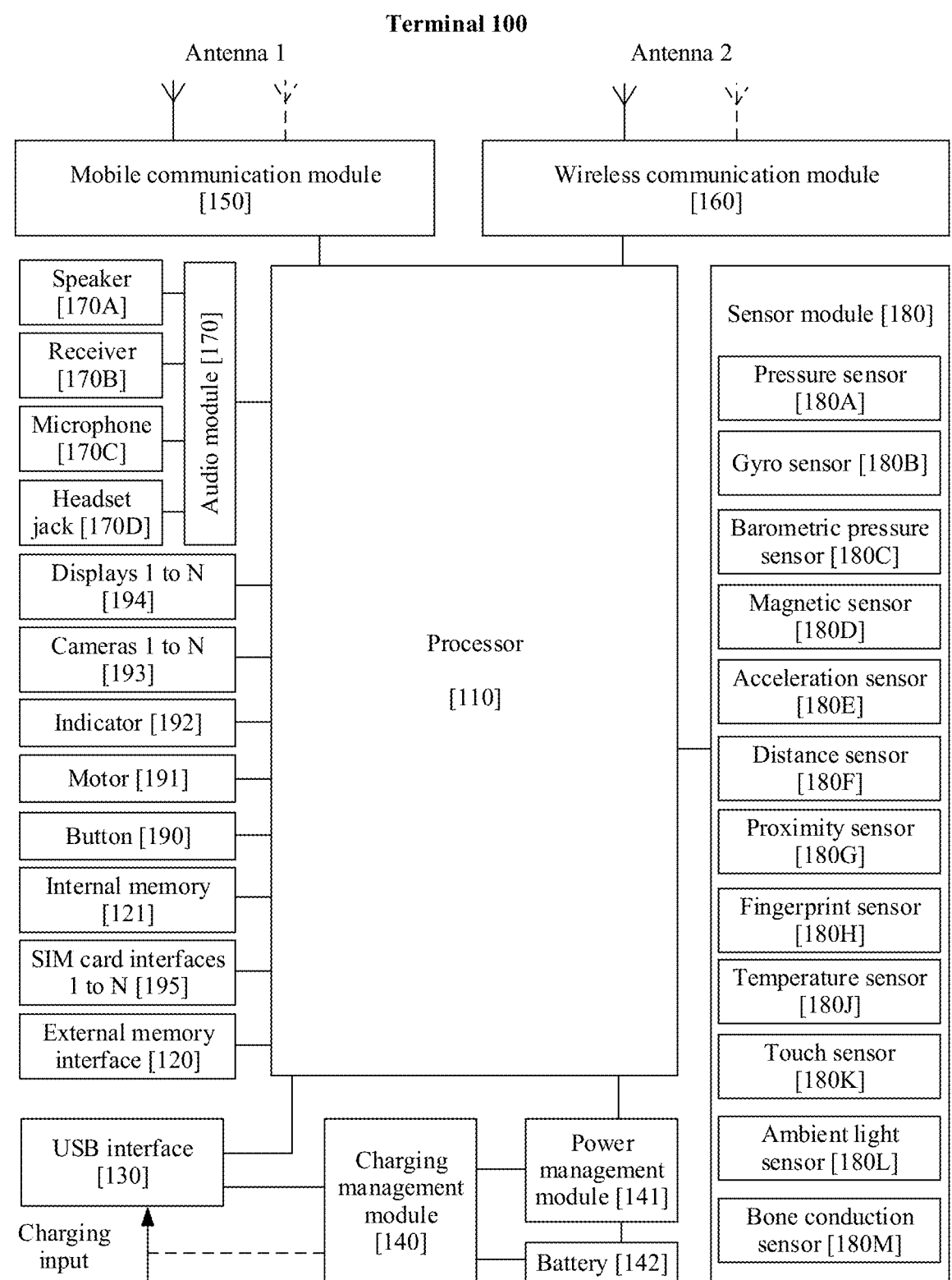
FIG. 13 is a schematic diagram of another embodiment of a terminal according to an embodiment of this disclosure.

FIG. 13 is a schematic diagram of another embodiment of a terminal according to an embodiment of this disclosure.

For ease of understanding, the following describes, by using an example, a structure of a terminal 100 provided in this embodiment of this disclosure. FIG. 13 is a schematic diagram of a structure of a terminal according to an embodiment of this disclosure.

As shown in FIG. 13, the terminal 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the terminal 100. In some other embodiments of this disclosure, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the terminal 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (IIC) interface, an inter-integrated circuit sound (IICS) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It may be understood that an interface connection relationship between the modules in this embodiment of this disclosure is merely an example for description, and does not constitute a limitation on the structure of the terminal 100. In some other embodiments of this disclosure, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the terminal 100 may be implemented through the antenna 1, the antenna 2, the mobile communication module 150, the wireless communication module 160, the modem processor, the baseband processor, and the like.

In some feasible implementations, the terminal 100 may communicate with another device by using a wireless communication function. For example, the terminal 100 may communicate with a second electronic device 200, the terminal 100 establishes a projection connection to the second electronic device 200, and the terminal 100 outputs projection data to the second electronic device 200. The projection data output by the terminal 100 may be audio and video data.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the terminal 100 and that includes wireless communication such as 1G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 2. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processor module. The wireless communication module 160 receives an electromagnetic wave by the antenna 1, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal 100 is coupled to the mobile communication module 150, and the antenna 2 is coupled to the wireless communication module 160, so that the terminal 100 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

In some feasible implementations, the display 194 may be configured to display interfaces for output by a system of the terminal 100. For all the interfaces output by the terminal 100, refer to related descriptions of the subsequent embodiments.

The terminal 100 may implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal.

The video codec is configured to compress or decompress a digital video. The terminal 100 may support one or more video codecs. In this way, the terminal 100 may play or record videos in a plurality of encoding formats, for example, moving picture experts group (MPEG)-1, MPEG-2, MPEG-3, and MPEG-4.

The NPU is a neural-network (NN) computing processor. The NPU quickly processes input information by drawing on a structure of a biological neural network, for example, by drawing on a transfer mode between human brain neurons, and may further continuously perform self-learning. Applications such as intelligent cognition of the terminal 100 may be implemented through the NPU, for example, image recognition, facial recognition, speech recognition, and text understanding The external memory interface 120 may be used to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (UFS).

The terminal 100 may implement audio functions such as music playing and recording by using the audio module 170, the speaker 170A, the receiver 170B, the microphone 170C, the headset jack 170D, the application processor, and the like. In some feasible implementations, the audio module 170 may be configured to play a sound corresponding to a video. For example, when the display 194 displays a video play picture, the audio module 170 outputs a video play sound.

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the terminal 100. The barometric pressure sensor 180C is configured to measure barometric pressure.

The acceleration sensor 180E may detect magnitudes of accelerations of the terminal 100 in various directions (usually on three axes or six axes). A magnitude and a direction of gravity may be detected when the terminal 100 is still. The acceleration sensor 180E may be further configured to identify a posture of the terminal, and is applied to an application such as switching between a landscape mode and a portrait mode or a pedometer.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a "touch panel". The touch sensor 180K may be disposed on the display 194. The touch sensor 180K and the display 194 form a touchscreen that is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal 100 at a position different from that of the display 194.

The button 190 includes a power button, a volume button, and the like. The button 190 may be a mechanical button, or a touch button. The terminal 100 may receive a button input, and generate a button signal input related to a user setting and function control of the terminal 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

Figure 14:
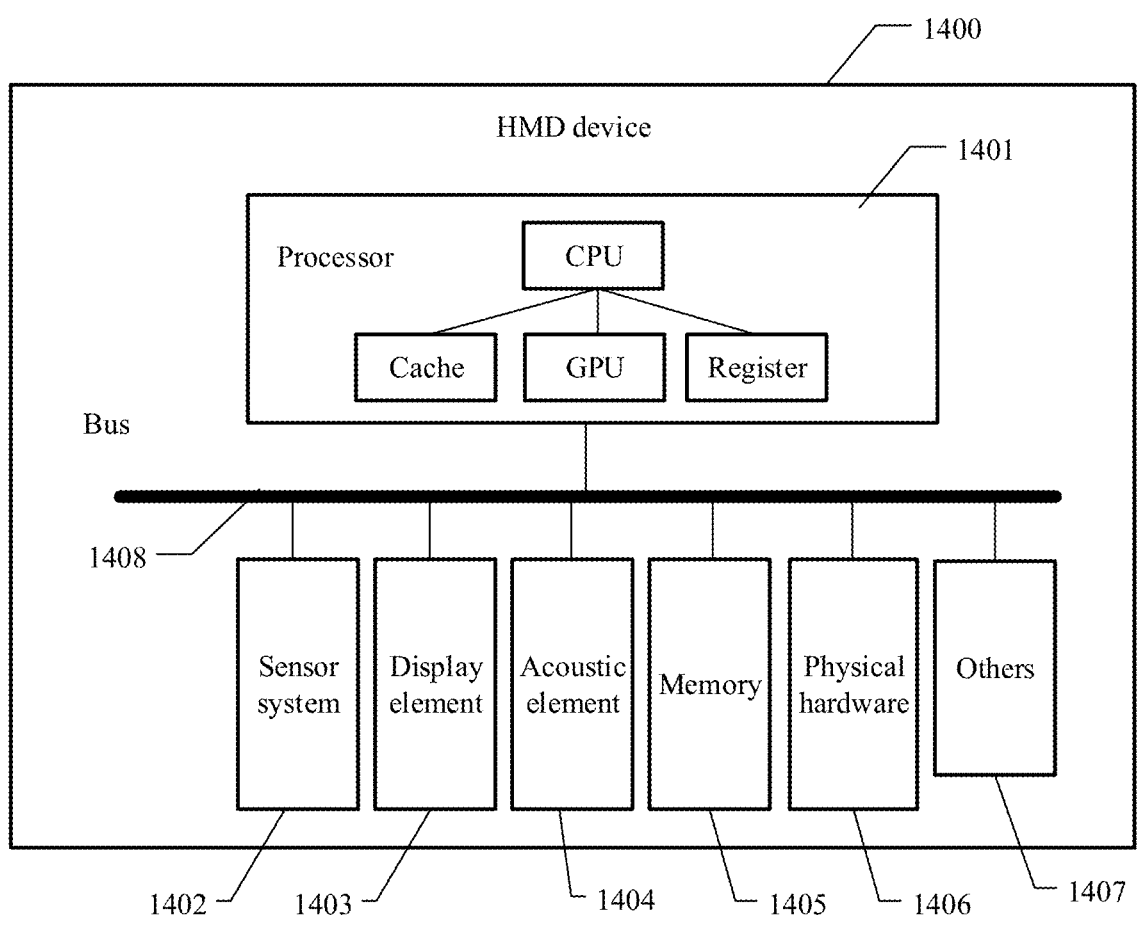
FIG. 14 is a schematic diagram of an HMD device according to an embodiment of this disclosure.

FIG. 14 is a schematic diagram of an HMD device according to an embodiment of this disclosure.

An HMD device in this disclosure is shown in FIG. 14. The HMD device includes:

A processor 1401, configured to: generate a corresponding operation control signal, send the operation control signal to a corresponding part of the device, and read and process data in software, especially read and process data and a program in the memory, so that each functional module in the device performs a corresponding function, to control a corresponding part to perform an action based on an instruction requirement. For example, the processor 1401 is applied to a variety of media processing algorithms, including man-machine interaction, motion tracking/prediction, rendering display, audio processing, and the like.

A sensor system 1402, configured to collect, obtain, or send information, including image information and distance information, such as user gesture information in this disclosure. The sensor system in this disclosure may include a 3-axis or 6-axis sensor, and is configured to: obtain motion information of the HMD device, for example, an angular velocity and a linear acceleration; position, track, and recognize a hand motion; and present the recognized hand motion in a display of the VR device. The sensor system further obtains static and dynamic features of a hand. Static characteristic information includes a fingertip fixed point, a palm centroid, a hand joint, and the like. Features of this type are usually obtained by using single frame data. Dynamic characteristic information includes a displacement vector, a moving speed, and the like. Such characteristic information is usually obtained by using multi-frame data. Because the foregoing is a mature conventional technology, details are not described in this disclosure document. Compared with the conventional technology, the sensor system in this disclosure includes a depth sensor. The depth sensor included in the sensor system may be sensor hardware dedicated for depth detection or a functional software module for depth detection, to obtain depth information of a hand, and integrate into user-interface interaction. The sensor system may further store some specific program instructions. A memory 1405, configured to: store the program and various data, and mainly store software units such as an operating system, an application, and a function instruction, or a subset thereof, or an extension set thereof. The memory 1405 may further include a non-volatile random access memory that provides the processor 1401 with hardware, software and data resources for managing a computing and processing device and that supports control software and applications, and is further configured to store a multimedia file, a running program, and an application.

A display element 1403, generally including a display and a supporting optical component, and configured to display content. A display interface is usually presented on a display, to perform man-machine interaction and file browsing.

An acoustic element 1404, including a microphone, a loudspeaker, a headset, or the like, and configured to output a sound.

Physical hardware 1406, including a physical function button such as an on/off button, a volume button, or a mechanical control button.

In addition to the foregoing parts 1401 to 1405, the device may further include another component 1407, configured to enrich functions of the device and beautify appearance of the device.

The foregoing hardware 1401 to 1407 may be electrically connected through the bus 1408 to implement coupling and communication.

Figure 15:
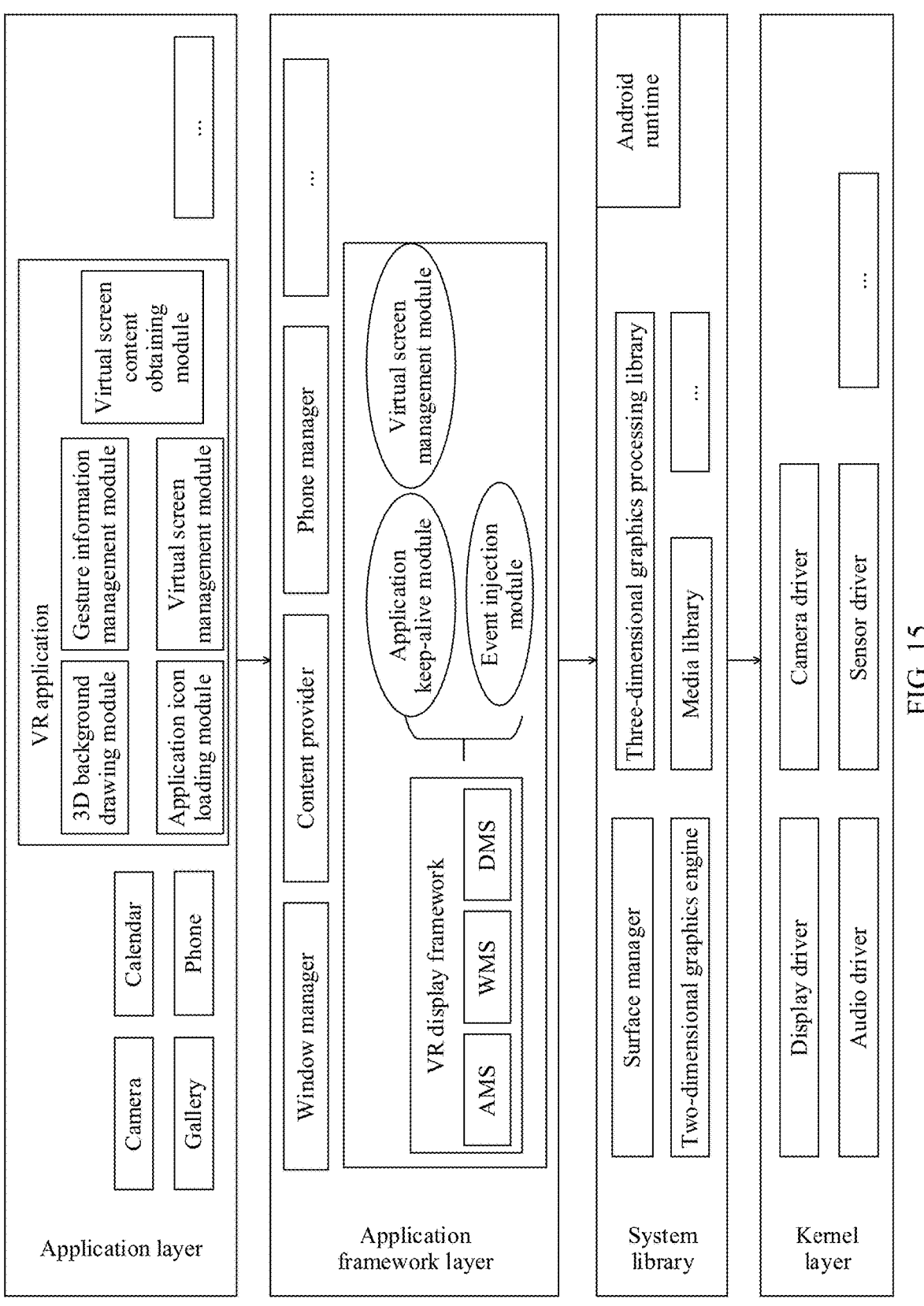
FIG. 15 is a block diagram of a software structure of a terminal according to an embodiment of this disclosure.

FIG. 15 is a block diagram of a software structure of a terminal according to an embodiment of this disclosure.

In a layered architecture, software is divided into several layers, and each layer has a clear role and task. The layers communicate with each other through a software interface. In some embodiments, the Android system is divided into four layers from top to bottom: an application layer, an application framework layer, an Android runtime and a system library, and a kernel layer.

The application layer may include a series of application packages.

As shown in FIG. 15, the application packages may include applications such as Phone, Camera, Gallery, Calendar, Call, Map, Navigation, WLAN, Bluetooth, Music, Videos, Messages, and a VR glasses application. The VR glasses application includes a 3D background drawing module, a gesture information management module, an application icon loading module, a virtual screen management module, and a virtual screen content obtaining module.

The 3D background drawing module is configured to complete drawing of a background picture displayed in a 3D virtual environment, so that the user can feel like being in a real scenario.

The gesture information management module is configured to obtain gesture information of the user, so that the user can control a control on a display interface in the virtual environment based on a gesture.

The application icon loading module is configured to load and display, in the virtual environment of the pair of VR glasses, icons of several applications (for example, WeChat, Weibo, and TikTok) on the terminal.

The virtual screen management module is configured to: create a virtual screen when the user taps an application icon to start an application, and destroy the virtual screen when the user closes the application.

The virtual screen content obtaining module is configured to: when the user taps a started application, obtain content in the application, and render the content in the application through distortion, to display the content in the virtual environment.

The application framework layer provides an application programming interface (application programming interface, API) and a programming framework for an application at the application layer. The application framework layer includes some predefined functions.

As shown in FIG. 15, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image.

The view system may be configured to construct an application program. A display interface may include one or more views. For example, a display interface including an SMS message notification icon may include a text display view and an image display view.

The phone manager is configured to provide a communication function for the terminal, for example, management of call statuses (including answering, declining, and the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an alert sound is played, the terminal vibrates, and the indicator light blinks.

In this embodiment of this disclosure, an activity manager service (AMS), a window manager service (WMS), and a download manager service (DMS) in the application framework layer may further include an application keep-alive module, an event injection module, and a virtual screen management module.

The application keep-alive module is configured to: after an application that has a multi-screen display mode function is started, control the terminal to enter the VR multi-screen display mode. In this mode, the terminal may run the plurality of applications at the same time, and support the applications to be in the active state at the same time.

The event injection module is configured to: in the multi-screen display mode, obtain an operation-corresponding event of the user, and distribute the event to a virtual screen corresponding to an application.

The virtual screen management module is configured to provide the terminal with a capability of creating a virtual screen and destroying a virtual screen.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, for example, a USB flash drive, a removable hard disk, a read-only memory (ROM), a random access memory (RAM), a floppy disk, or a compact disc.

The foregoing embodiments are merely intended for describing the technical solutions of this disclosure other than limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this disclosure.

What is claimed is:

1. An interface control method, comprising:

obtaining, by a terminal, a first operation on a first interface displayed in a virtual environment, wherein the first interface comprises at least two dividable components;

displaying, by the terminal in the virtual environment based on division location information in response to the first operation, a first subinterface and a second subinterface that are obtained by dividing the first interface, wherein the first subinterface comprises a first dividable component of the at least two dividable components, the second subinterface comprises a second dividable component adjacent to the first dividable component, and the division location information comprises a boundary between the first dividable component and the second dividable component;

obtaining, by the terminal, a second operation on a second interface displayed in the virtual environment, wherein the second interface comprises at least two dividable components, wherein the first interface is an interface of a first application, and the second interface is an interface of a second application different from the first application;

displaying, by the terminal in the virtual environment based on second division location information in response to the second operation, a third subinterface and a fourth subinterface that are obtained by dividing the second interface, wherein the third subinterface comprises a first dividable component of the at least two dividable components of the second interface, the fourth subinterface comprises a second dividable component adjacent to the first dividable component of the second interface, and the second division location information comprises a boundary between the third dividable component and the fourth dividable component;

moving, by the terminal, the first subinterface toward the third subinterface; and when a distance between the first subinterface and the third subinterface becomes equal to or less than a first threshold as the first subinterface approaches the third subinterface and without contacting the third subinterface, wherein the first threshold is a positive value greater than 0, displaying, by the terminal in the virtual environment, a fifth subinterface obtained by combining the first subinterface and the third subinterface, wherein the first subinterface comprises a first icon for controlling a first function of the first application, the third subinterface comprises a second icon for controlling a second function of the second application; and the fifth subinterface comprises a third icon, and the third icon is used to control the first function of the first application and the second function of the second application, wherein the first function is the same as the second function.

2. The method according to claim 1, wherein the first operation comprises first voice information obtained by the terminal using a voice collection apparatus, and wherein the fifth subinterface is controlled based on second voice information obtained by the terminal using the voice collection apparatus.

3. The method according to claim 1, wherein the first operation comprises a first gesture obtained by the terminal using a sensor system, and wherein the first gesture comprises: moving a flat palm with fingers together by a preset distance in a first direction in which a palm plane extends, wherein the first direction in which the palm plane extends is parallel to the boundary.

4. The method according to claim 1, wherein the method further comprises:

displaying, by the terminal, a division line on the boundary between the first dividable component and the second dividable component.

5. The method according to claim 1, wherein displaying, by the terminal in the virtual environment based on division location information in response to the first operation, the first subinterface and the second subinterface that are obtained by dividing the first interface comprises:

displaying, by the terminal, the first subinterface in a first location, and displaying the second subinterface in a second location, wherein the first location is the same as a first initial location, a distance between the second location and a second initial location in a direction away from the first initial location is a first preset value, the first initial location is a location of the first subinterface on the first interface when the terminal obtains a first instruction, and the second initial location is a location of the second subinterface on the first interface when the terminal obtains the first instruction; or the second location is the same as a second initial location, and a distance between the first location and a first initial location in a direction away from the second initial location is a second preset value; or a distance between the first location and a first initial location in a direction away from a second initial location is a third preset value, and a distance between the second location and the second initial location in a direction away from the first initial location is a fourth preset value.

6. The method according to claim 1, wherein the method further comprises:

moving, by the terminal, the first subinterface in response to a third operation on the first subinterface.

7. The method according to claim 6, wherein the third operation comprises: a pinch grip gesture pointing to the first subinterface, wherein the pinch grip gesture comprises a hand state in which a thumb approaches at least one of four fingers, and keeping the pinch grip gesture and moving; or touching and holding the first subinterface and moving; or keeping an open palm gesture and moving, wherein the open palm gesture comprises a hand state with fingers together and a palm up.

8. The method according to claim 1, wherein the first subinterface is an input interface of the first application, the second subinterface is an output interface of the first application, the third subinterface is an input interface of the second application, the fourth subinterface is an output interface of the second application, and the method further comprises:

displaying, by the terminal, an indication identifier on an edge of the fifth subinterface, wherein the indication identifier is used to determine an application currently controlled by the fifth subinterface;

based on the indication identifier pointing to the second subinterface, controlling, by the terminal, the first application based on an input operation performed on the fifth subinterface; and based on the indication identifier pointing to the fourth subinterface, controlling, by the terminal, the second application based on an input operation performed on the fifth subinterface.

9. A terminal, comprising one or more processors and a memory, wherein the memory stores computer-readable instructions; and upon the one or more processors reading the computer-readable instructions, the terminal is enabled to implement:

obtaining, by the terminal, a first operation on a first interface displayed in a virtual environment, wherein the first interface comprises at least two dividable components;

displaying, by the terminal in the virtual environment based on division location information in response to the first operation, a first subinterface and a second subinterface that are obtained by dividing the first interface, wherein the first subinterface comprises a first dividable component of the at least two dividable components, the second subinterface comprises a second dividable component adjacent to the first dividable component, and the division location information comprises a boundary between the first dividable component and the second dividable component;

obtaining, by the terminal, a second operation on a second interface displayed in the virtual environment, wherein the second interface comprises at least two dividable components, wherein the first interface is an interface of a first application, and the second interface is an interface of a second application different from the first application;

displaying, by the terminal in the virtual environment based on second division location information in response to the second operation, a third subinterface and a fourth subinterface that are obtained by dividing the second interface, wherein the third subinterface comprises a first dividable component of the at least two dividable components of the second interface, the fourth subinterface comprises a second dividable component adjacent to the first dividable component of the second interface, and the second division location information comprises a boundary between the third dividable component and the fourth dividable component;

moving, by the terminal, the first subinterface toward the third subinterface; and when a distance between the first subinterface and the third subinterface becomes equal to or less than a first threshold as the first subinterface approaches the third subinterface and without contacting the third subinterface, wherein the first threshold is a positive value greater than 0, displaying, by the terminal in the virtual environment, a fifth subinterface obtained by combining the first subinterface and the third subinterface, wherein the first subinterface comprises a first icon for controlling a first function of the first application, the third subinterface comprises a second icon for controlling a second function of the second application; and the fifth subinterface comprises a third icon, and the third icon is used to control the first function of the first application and the second function of the second application, wherein the first function is the same as the second function.

10. The terminal according to claim 9, wherein the first operation comprises first voice information obtained by the terminal using a voice collection apparatus, and wherein the fifth subinterface is controlled based on second voice information obtained by the terminal using the voice collection apparatus.

11. The terminal according to claim 9, wherein the first operation comprises a first gesture obtained by the terminal using a sensor system, and wherein the first gesture comprises: moving a flat palm with fingers together by a preset distance in a first direction in which a palm plane extends, wherein the first direction in which the palm plane extends is parallel to the boundary.

12. The method according to claim 9, wherein the terminal is further enabled to implement:

displaying, by the terminal, a division line on the boundary between the first dividable component and the second dividable component.

13. The terminal according to claim 9, wherein displaying, by the terminal in the virtual environment based on division location information in response to the first operation, the first subinterface and the second subinterface that are obtained by dividing the first interface specifically comprises:

displaying, by the terminal, the first subinterface in a first location, and displaying the second subinterface in a second location, wherein the first location is the same as a first initial location, a distance between the second location and a second initial location in a direction away from the first initial location is a first preset value, the first initial location is a location of the first subinterface on the first interface when the terminal obtains a first instruction, and the second initial location is a location of the second subinterface on the first interface when the terminal obtains the first instruction; or the second location is the same as a second initial location, and a distance between the first location and a first initial location in a direction away from the second initial location is a second preset value; or a distance between the first location and a first initial location in a direction away from a second initial location is a third preset value, and a distance between the second location and the second initial location in a direction away from the first initial location is a fourth preset value.

14. The terminal according to claim 9, wherein the terminal is further enabled to implement:

moving, by the terminal, the first subinterface in response to a third operation on the first subinterface.

15. The terminal according to claim 14, wherein the third operation comprises: a pinch grip gesture pointing to the first subinterface, wherein the pinch grip gesture comprises a hand state in which a thumb approaches at least one of four fingers, and keeping the pinch grip gesture and moving; or touching and holding the first subinterface and moving; or keeping an open palm gesture and moving, wherein the open palm gesture comprises a hand state with fingers together and a palm up.

16. The terminal according to claim 9, wherein the first subinterface is an input interface of the first application, the second subinterface is an output interface of the first application, the third subinterface is an input interface of the second application, the fourth subinterface is an output interface of the second application, and wherein the terminal is further enabled to implement:

displaying, by the terminal, an indication identifier on an edge of the fifth subinterface, wherein the indication identifier is used to determine an application currently controlled by the fifth subinterface;

based on the indication identifier pointing to the second subinterface, controlling, by the terminal, the first application based on an input operation performed on the fifth subinterface; and based on the indication identifier pointing to the fourth subinterface, controlling, by the terminal, the second application based on an input operation performed on the fifth subinterface.

* * * * *